(12) United States Patent
McDonald et al.

(10) Patent No.: US 6,648,222 B2
(45) Date of Patent: Nov. 18, 2003

(54) INTERNET-BASED ZERO INTRINSIC VALUE SMART CARD WITH VALUE DATA ACCESSED IN REAL TIME FROM REMOTE DATABASE

(76) Inventors: Ian McDonald, 3232 N. 43rd Pl., Phoenix, AZ (US) 85018; Yada Schneider, P.O. Box 92, Camp Verda, AZ (US) 86322

(*) Notice: Subject to any disclaimer, the term of this patent is extended or adjusted under 35 U.S.C. 154(b) by 0 days.

(21) Appl. No.: 10/260,445

(22) Filed: Sep. 27, 2002

(65) Prior Publication Data

US 2003/0080186 A1 May 1, 2003

Related U.S. Application Data

(63) Continuation-in-part of application No. 09/580,940, filed on May 30, 2000.
(60) Provisional application No. 60/137,784, filed on Jun. 2, 1999.

(51) Int. Cl.[7] .................................................. G06K 5/00
(52) U.S. Cl. ....................................... 235/380; 235/379
(58) Field of Search ................................. 235/380, 379, 235/382, 383; 705/44, 42, 41, 43, 39; 713/201

(56) References Cited

U.S. PATENT DOCUMENTS

| | | | | |
|---|---|---|---|---|
| 5,903,881 A | * | 5/1999 | Schrader et al. | 705/42 |
| 6,282,522 B1 | * | 8/2001 | Davis et al. | 705/41 |
| 6,334,117 B1 | * | 12/2001 | Covert et al. | 705/43 |
| 2001/0037290 A1 | * | 11/2001 | Lai | 705/39 |
| 2002/0188863 A1 | * | 12/2002 | Friedman | 713/201 |
| 2003/0046231 A1 | * | 3/2003 | Wu | 705/43 |
| 2003/0080186 A1 | * | 5/2003 | McDonald et al. | 235/380 |

* cited by examiner

Primary Examiner—Thien M. Le
(74) Attorney, Agent, or Firm—Jeffrey D. Moy; Harry M. Weiss; Weiss, Moy & Harris, P.C.

(57) ABSTRACT

A card-based system electronically transfers funds in real time. A customer card stores digital data representing a unique customer account number associated with a unique, remotely located customer account having at least one vendor-associated subaccount. A merchant terminal having a merchant IP address designating a unique merchant is affiliated with at least one unique vendor for transmitting to a system control center customer transaction data including the merchant IP address, the customer account number read from the customer card and account adjustment data designating either the value of a credit to be added to the vendor-associated subaccount reflecting a customer prepayment or the value to be subtracted from the vendor-associated customer subaccount reflecting a customer purchase. The system control center maintains a vendor account database and a customer account database. The customer account database associates each customer account number with the unique customer account number, stores the subaccount credit balance corresponding to the specified vendor, receives the customer transaction data transmitted by the merchant terminal, adjusts the customer subaccount value up or down in response to the customer transaction data, transmits to the merchant terminal customer account status information and adjusts the vendor account database to reflect credits resulting from vendor-associated customer transactions.

10 Claims, 33 Drawing Sheets

SYSTEM CONTROL CENTER TO SPECIFIED VEHICLE
DATA COMMUNICATIONS INTERFACE

DATA TRANSFERRED FROM MOBILE SYSTEM ELEMENTS TO SYSTEM CONTROL CENTER

TIME

DRIVER ID AND AUTHORIZATION

VEHICLE ID

VEHICLE LOCATION

CARD USER ID

CARD USER VEHICLE ENTRY TIME / LOCATION

FARE COLLECTION DATA
1. PASSENGER COUNT
2. TOTAL FARE COLLECTIONS

VEHICLE SYSTEM OPERATING DATA
1. SPEED PROFILE / CUMULATIVE DAILY MILEAGE
2. FUEL / OIL QUANTITY
3. ENGINE RPM / TEMPERATURE / FAILURE ALERTS
4. DOOR POSITION
5. SAFETY WARNING SIGNALS
6. TOTAL VEHICLE WEIGHT

VIDEO SIGNAL FROM VEHICLE (SNAPSHOT CAPTURE)

ALPHA / NUMERIC MESSAGES VIA KEYBOARD
1. HOT KEYS FOR CANNED MESSAGES
2. CUSTOMIZED MESSAGES

END OF OPERATING DAY DATA SUMMARY
1. TOTAL PASSENGER COUNT
2. HOURLY PASSENGER COUNT
3. DRIVER ON DUTY / OFF DUTY TIMES
4. VEHICLE OPERATING TIME / MILEAGE
5. VEHICLE SYSTEMS FAILURE / WARNING STATUS
6. PASSENGER DEMOGRAPHICS
7. LOADING / CAPACITY STATUS

*FIG. 5*

DATA TRANSFERRED FROM SYSTEM CONTROL CENTER TO MOBILE SYSTEM ELEMENTS

FARE CONTROL DATA

1. TIME OF DAY FARE
2. DAY OF WEEK FARE
3. HOLIDAY FARES
4. DISCOUNT FARES
5. PROMOTIONAL FARES
    1. BY CUSTOMER ID
    2. BY VEHICLE LOCATION ENTRY POINT
    3. BY PROMOTIONAL CARD SPONSOR
6. DISCOUNTS BASED ON VOLUME PURCHASES
    1. BY CUSTOMER
    2. BY CUSTOMER'S EMPLOYER

ALPHA / NUMERIC MESSAGES

ALPHA / NUMERIC MESSAGES

HEAD SIGN CONTROL

ROUTINE DRIVER ADVISORIES

1. MINUTES AHEAD OF SCHDULE OR BEHIND SCHEDULE
2. SCHEDULE COMPLIANCE WARNING
3. EXCESSIVE VEHICLE SPEED WARNING
4. EXCESSIVE VEHICLE WEIGHT
5. ROUTE DEVIATION ALERT
6. TIME BEHIND PRECEEDING VEHICLE
7. TIME AHEAD OF FOLLOWING VEHICLE
8. CHANGE ROUTE / PICK UP PASSENGER / JOB LIST

*FIG. 6*

CLIENT MANAGEMENT DATA GENERATED BY SYSTEM CONTROL CENTER

REAL TIME VEHICLE LOCATION MAPPING

REAL TIME VEHICLE SCHEDULE COMPLIANCE

REAL TIME FARE COLLECTION DATA SUMMARIES

1. BY VEHICLE
2. BY ROUTE
3. BY GEOGRAPHIC AREA

SYSTEM CAPACITY UTILIZATION ANALYSIS

1. SYSTEM LOAD FACTOR BY TIME OF DAY
2. SYSTEM LOAD FACTOR BY DAY OF WEEK OR TIME OF YEAR
3. ROUTE LOAD FACTOR
4. VEHICLE LOAD FACTOR
5. COMPARATIVE ANALYSIS: CURRENT VERSUS HISTORICAL LOAD FACTOR DATA
6. SYSTEM / ROUTE / VEHICLE OVERLOAD WARNING
7. SCHEDULE COMPLIANCE TIME WINDOW VIOLATIONS

SYSTEM CAPACITY PREDICTIONS

1. VEHICLE / ROUTE OVERLOAD PREDICTIONS
2. SCHEDULE COMPLIANCE FAILURE OR CONFLICT PREDICTIONS

RELATIVE POSITION OF MULTIPLE VEHICLES ON SAME ROUTE

1. TIME ONE VEHICLE BEHIND PRECEEDING VEHICLE
2. TIME ONE VEHICLE AHEAD OF FOLLOWING VEHICLE

PREVENTIVE MAINTENANCE

1. THRESHOLD (SET)
2. TRACK MILES, HOURS IN USE, TEMPERATURE, PRESSURE, SPEED RECORDING

DRIVER AUTHORIZATION

1. CHECK VEHICLE ID
2. ACTIVATE IGNITION CUT OFF

*FIG. 7*

Track 1 Character Definition

ISO 7811-2 Track 1 character encoding definitions

SS  FC  PAN  FS  NAME  FS  DATE  SVC CD  DISCRETIONARY DATA  ES  LRC

| FIELD | DESCRIPTION | LENGTH | FORMAT |
|---|---|---|---|
| SS | Start Sentinel | 1 | % |
| FC | Format Code ("B" for credit cards) | 1 | Alpha/Numeric |
| PAN | Primary Account Number | 19 max | Numeric |
| FS | Field Seperator | 1 | ^ |
| NAME | Card Holder Name | 2-26 max | Alpha/Numeric |
| FS | Field Seperator | 1 | ^ |
| DATE | Expiration Data (YYMM) | 4 | Numeric |
| SVC CD | Service Code | 3 | Numeric |
| Descretionary Data | Optional Issuer Data | variable | Alpha/Numeric |
| ES | End Sentinel | 1 | ? |
| LRC | Longitudinal Redundancy Check | 1 | |
| | Total Can Not Exceed 79 bytes | 73 | |

Track 2 Character Definition

ISO 7811-2 Track 2 character encoding definitions

SS  PAN  FS  DATE  SVC CD  DISCRETIONARY DATA  ES  LRC

| FIELD | DESCRIPTION | LENGTH | FORMAT |
|---|---|---|---|
| SS | Start Sentinel | 1 | ; |
| PAN | Primary Account Number | 19 max | Numeric |
| FS | Field Seperator | 1 | = |
| DATE | Expiration Date (YYMM) | 4 | Numeric |
| SVC CD | Service Code | 3 | Numeric |
| Discretionary Data | Optional Issuer Data | variable | Numeric |
| ES | End Sentinel | 1 | 0x0F HEX |
| LRC | Longitudinal Redundancy Check | 1 | |
| | Total CAN NOT exceed 40 bytes | 40 | |

FIG. 10A

| Name | FormNumber | FieldNumber | Length | Type | ExtraInfo |
|---|---|---|---|---|---|
| JobNumber | 0 | 0 | 6 | Number | |
| JobStatus | 0 | 1 | 2 | Selection | 0 |
| CustomerName | 0 | 2 | 20 | Normal Text | |
| NumberInParty | 0 | 3 | 2 | Number | |
| PickupAddress | 0 | 4 | 2 | Selection | 9 |
| PickupTime | 0 | 5 | 4 | Time4 | |
| DropOffAddress | 0 | 6 | 2 | Selection | 9 |
| DropOffTime | 0 | 7 | 4 | Time4 | |
| ListAddress | 0 | 8 | 2 | Selection | 9 |
| ListTime | 0 | 9 | 4 | Time4 | |
| Comment | 0 | 10 | 25 | Normal Text | |
| PickupDropoffStatus | 0 | 11 | 1 | Selection | 5 |
| NoShowReason | 0 | 16 | 1 | Selection | 6 |
| NorthSouth | 0 | 54 | 1 | Normal Text | |
| EastWest | 0 | 55 | 1 | Normal Text | |
| Latitude | 0 | 56 | 8 | Number | |
| Longitude | 0 | 57 | 8 | Number | |
| NorthSouth | 2 | 54 | 1 | Normal Text | |
| EastWest | 2 | 55 | 1 | Normal Text | |
| Latitude | 2 | 56 | 8 | Number | |
| Longitude | 2 | 57 | 8 | Number | |
| Longitude | 2 | 57 | 8 | Number | |
| Speed | 2 | 58 | 4 | Number | |
| Direction | 2 | 59 | 4 | Number | |
| OverlayMessage | 3 | 1 | 18 | Normal Text | |
| DriverID | 4 | 1 | 2 | Number | |
| DriverStatus | 4 | 3 | 1 | Selection | 3 |
| RouteNumber | 4 | 4 | 2 | Number | |
| BreakStatus | 4 | 6 | 1 | Selection | 4 |
| ExitFlagForm | 4 | 7 | 1 | Selection | 3 |
| Address | 4 | 8 | 1 | Selection | 9 |
| Message | 4 | 10 | 30 | Normal Text | |
| Message | 4 | 11 | 30 | Normal Text | |
| Message | 4 | 12 | 30 | Normal Text | |
| Message | 4 | 13 | 30 | Normal Text | |
| JobNumber | 5 | 0 | 6 | Number | |
| Name | 5 | 2 | 26 | Normal Text | |
| NumInParty | 5 | 3 | 2 | Number | |
| Address | 5 | 8 | 1 | Selection | 9 |
| Time | 5 | 9 | 4 | Time4 | |
| AccountNumber | 5 | 10 | 16 | Number | |
| ExpiryDate | 5 | 11 | 10 | Date6 | |
| Message | 14 | 1 | 120 | Normal Text | |
| Message | 15 | 1 | 160 | Normal Text | |

FIG. 10B

SYSTEM CUSTOMER TO VENDOR MONEY FLOW PATHS
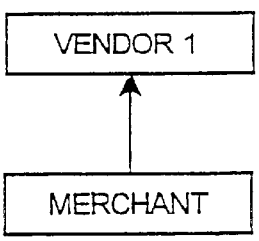
FIG. 31A
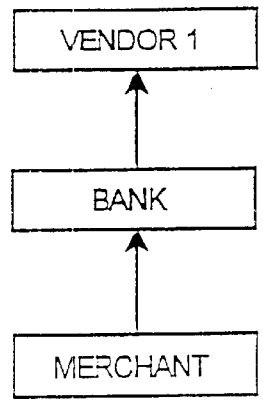
FIG. 31B
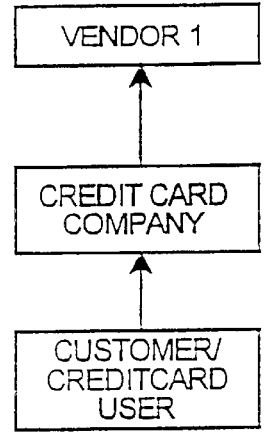
FIG. 31C
FIG. 31

US 6,648,222 B2

INTERNET-BASED ZERO INTRINSIC VALUE SMART CARD WITH VALUE DATA ACCESSED IN REAL TIME FROM REMOTE DATABASE

This application is a Continuation-in-Part of co-pending U.S. patent application Ser. No. 09/580,940, filed May 30, 2000, entitled ""INTERNET-BASED ZERO INTRINSIC VALUE SMART CARD WITH VALUE DATA ACCESSED IN REAL TIME FROM REMOTE DATA-BASE" by Ian McDonald and Yada Schneider. This application claims the benefit of prior filed co-pending U.S. Provisional Application Serial No. 60/137,784, filed Jun. 2, 1999, entitled "INTERNET-BASED ZERO INTRINSIC VALUE SMART CARD WITH VALUE DATA ACCESSED IN REAL TIME FROM REMOTE DATA-BASE" by Ian McDonald and Yada Schneider and which is a Continuation-in-Part of a U.S. patent application filed on Apr. 17, 2000 and entitled "REAL TIME INTERNET-BASED TRANSIT MANAGEMENT AND CONTROL SYSTEM WITH WIRELESS VEHICULAR DATA LINK."

BACKGROUND OF THE INVENTION

1. Field of the Invention

This invention relates to Internet-based zero intrinsic value smart card with value data accessed in real time from remote database.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 5 represents a summary chart illustrating representative data transferred from the mobile system elements to the system control center.

FIG. 6 represents a summary chart illustrating representative data transferred from the system control center to the mobile system elements.

FIG. 7 represents a summary chart illustrating representative client management data capable of being generated by the system control center.

FIG. 10A illustrates the configuration of ISO format data as stored on commercial credit cards and transit system cards.

FIG. 10B illustrates the data format specifically configured for processing by the Tranz:Act Server of the present invention.

FIG. 31 illustrates system customer to vendor money flow paths.

DESCRIPTION OF THE PREFERRED EMBODIMENT

1. The Transit Management and Control Application

In order to better illustrate the advantages of the invention and its contributions to the art, a preferred embodiment of the invention will now be described in some detail.

Figure 1:
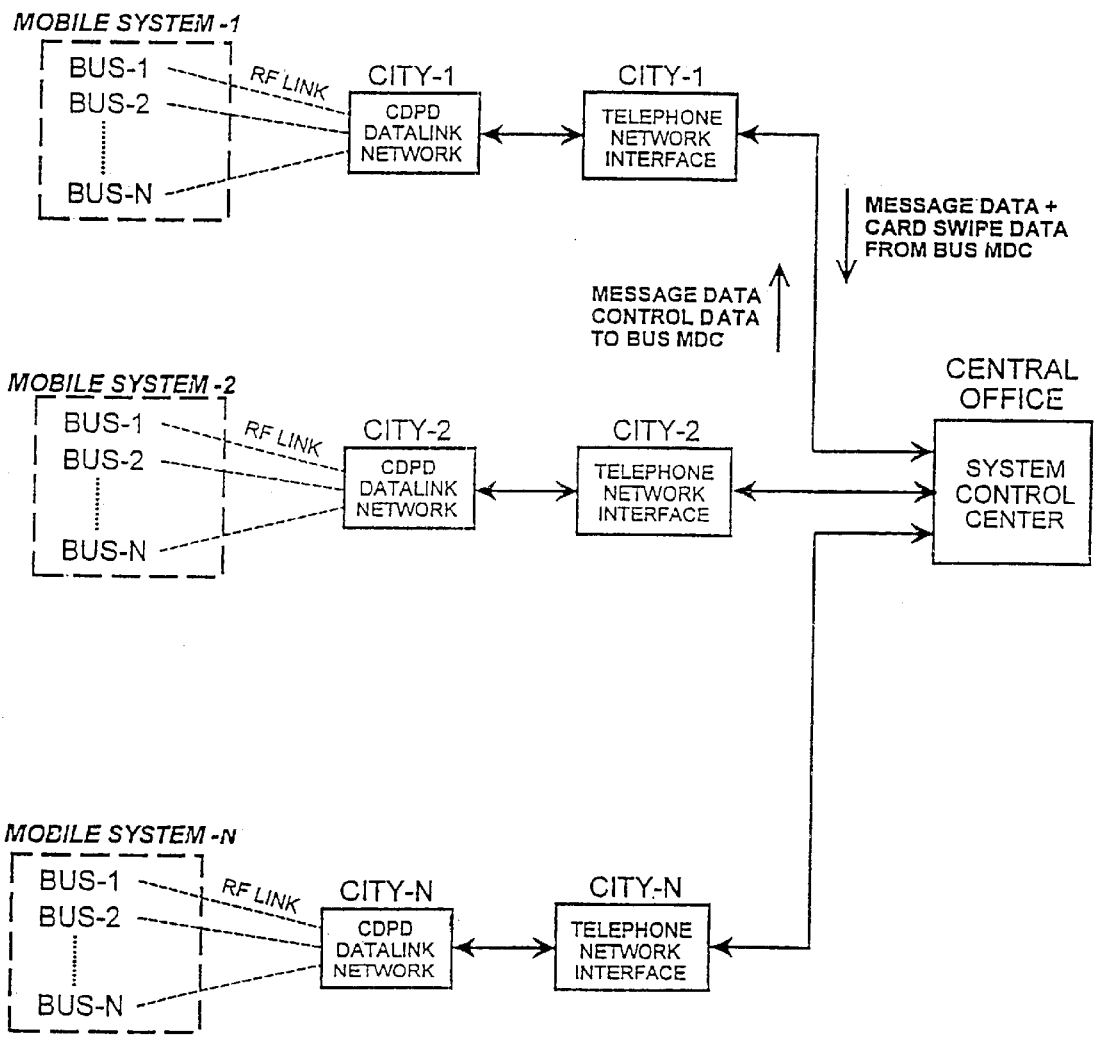
FIG. 1 represents a block diagram illustrating the interconnections between system control center and specified vehicle data communications elements.

FIG. 1 represents a block diagram indicating how the system control center located at a single central office interfaces with a variety of mobile system elements located in geographically distributed cities or other locations.

Each bus within a system includes a commercially available wireless Mobile Data Console (MDC) such as a Mentor Mobile Data Computer by Mentor Engineering of Calgary AB, Canada which provides a wireless radio frequency (RF) link between the mobile system element or bus and existing CDPD data link networks installed and operating in most localities which provide cellular voice telecommunication systems. Each MDC includes an internal card reader for reading conventional magnetically encoded cards such as commercial credit cards. An outboard card reader is attached to the MDC or to the bus fare box to facilitate customer usage. The outboard MDC card reader may also be configured to optically scan cards having bar code encoded data or to function in combination with wireless radio activated proximity cards. The MDC can be configured to receive card swipe data from all categories of card readers. Some states are planning to use driver's licenses having bar code data identifying the licensed driver and supplying additional data. System specific or proprietary transit cards having magnetically encoded data represents presently represents the most readily available, lowest cost form of card identification system. The system of the present invention can also access system data by MDC readouts from conventional magnetic stripe credit cards.

FIG. 10A indicates the data storage format for data tracks 1 and 2 of a standard magstripe commercial credit card or other card such as the transit card for use in connection with the present invention. In response to a card swipe, the outboard card reader reads the card data, decodes the card data and sends the decoded card data to the MDC. The MDC internally reformats the data for use in connection with the system of the present invention in accordance with the data format indicated in FIG. 10B. As will be explained below, the MDC transmits the reconfigured FIG. 10B data format string to the system control center. Appendix A illustrates how the Mentor MDC software used in connection with the preferred embodiment of the invention is specially configured for use in connection with the system of the present invention.

The transit card element of the system includes stored digital data which identifies the person to whom the card belongs. As will be explained below, additional data is stored in a database located at the system control center and includes substantial additional user-related data. When a fare paying passenger elects to utilize a conventional VISA, MasterCard, American Express or other commercial credit card, the system control system data processing software will detect that fact and procure the necessary additional information directly from the credit card customer database by communicating with the credit card provider's offsite database.

As illustrated in the FIG. 1 system block diagram, each individual bus within a single mobile system maintains a radio frequency data link with a local CDPD data link network which is interconnected with the local telephone network via an appropriate interface. As an element of that telephone network interface, the system control center will typically utilize at least one and preferably at least two leased T-1 high speed data communication channels to provide both high speed data communication capabilities as well as system fault tolerance.

When a transit passenger enters a particular bus, that individual performs a conventional card swipe operation allowing the passenger's card data to be read by to the MDC mounted in the bus.

Figure 2:
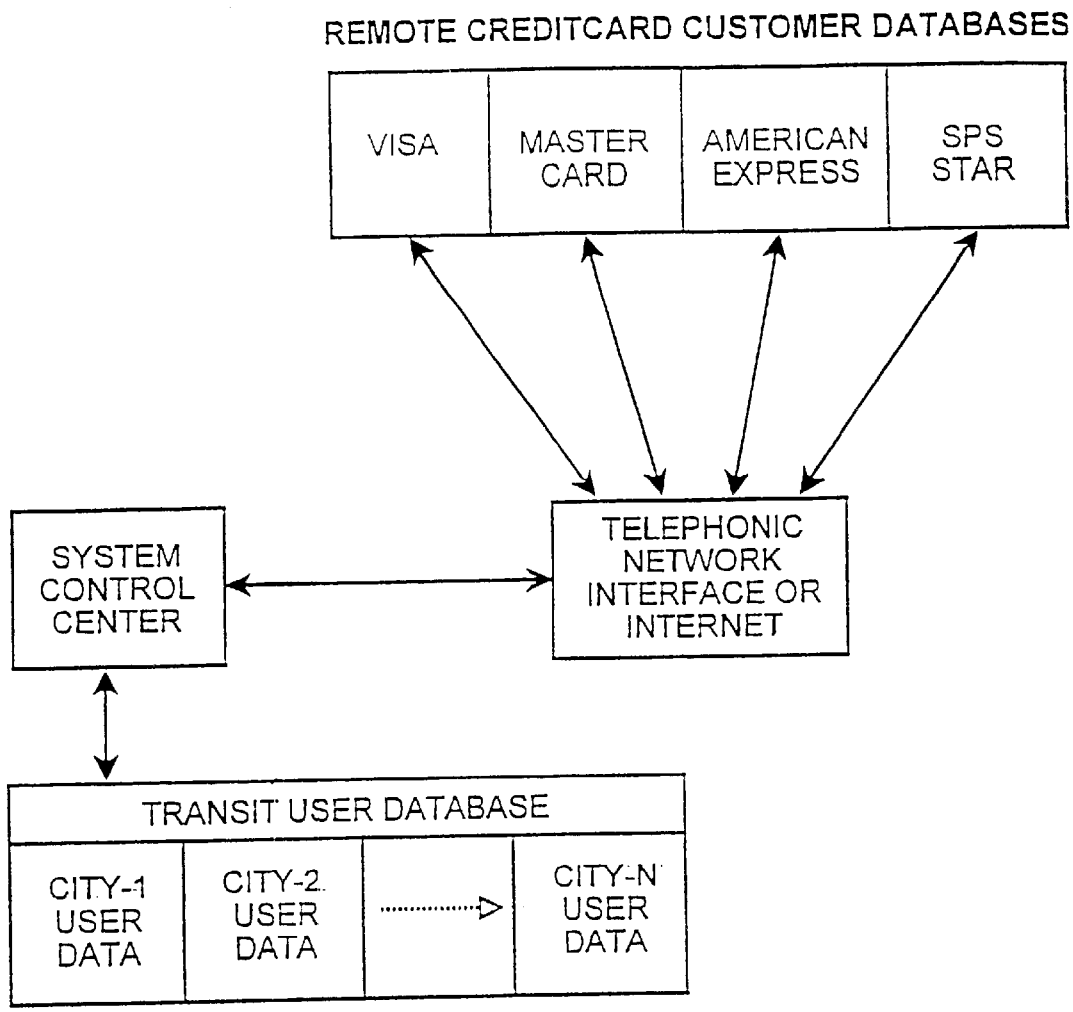
FIG. 2 represents a block diagram illustrating card user account database access by the system control center.

As illustrated in the FIG. 2 block diagram which represents a continuation of the FIG. 1 block diagram, transmission of card swipe data from the bus MDC to the system control center allows the system control center to access and evaluate information relating to the card user, whether the card being read represents a proprietary or use specific transit card or a standard commercial credit card.

The system control software evaluates the received card data and determines first whether the card number represents a proprietary card number corresponding to information stored in the onsite transit user database or another specified form of card data where the necessary additional user data must be procured from remote credit card customer databases.

The system utilizes the first four bytes of the incoming card swipe data to identify the appropriate database to access. The identified database is then accessed to determine whether the card swipe data corresponds to an authorized user number stored in the database and whether that authorized user has a sufficient amount of credit on account to pay the bus fare charges indicated by the system for assessment against the user's credit balance. When the card swipe data corresponds to an authorized user with a sufficient credit balance, the system control center transmits control data back to the bus MDC over dedicated telephone lines and CDPD data link network to communicate an "ACCEPTED" message which is displayed both to the card holder and to the bus driver.

The system control center software also cross checks the date and time data corresponding to the last use of the transit card. If the last use falls within a designated time window, for example, one hour since the last account charge, the system can be programmed to presume that the second, close in time charge corresponds to an authorized bus to bus transfer such that the system will generate an "ACCEPTED" message without charging the user's credit balance.

The search speed of the proprietary transit user database is enhanced by assigning sequential, non-overlapping card serial number sequences to different geographically distributed cities which will be simultaneously accessing the data stored in the system database.

As illustrated by the FIG. 1 block diagram, a single system control center located at a single central office location can process and control data from a virtually unlimited number of buses or other transit vehicles operating within the jurisdiction of a single mobile system while simultaneously processing data from and managing transit systems operating in a virtually unlimited number of additional jurisdictions.

Figure 3:
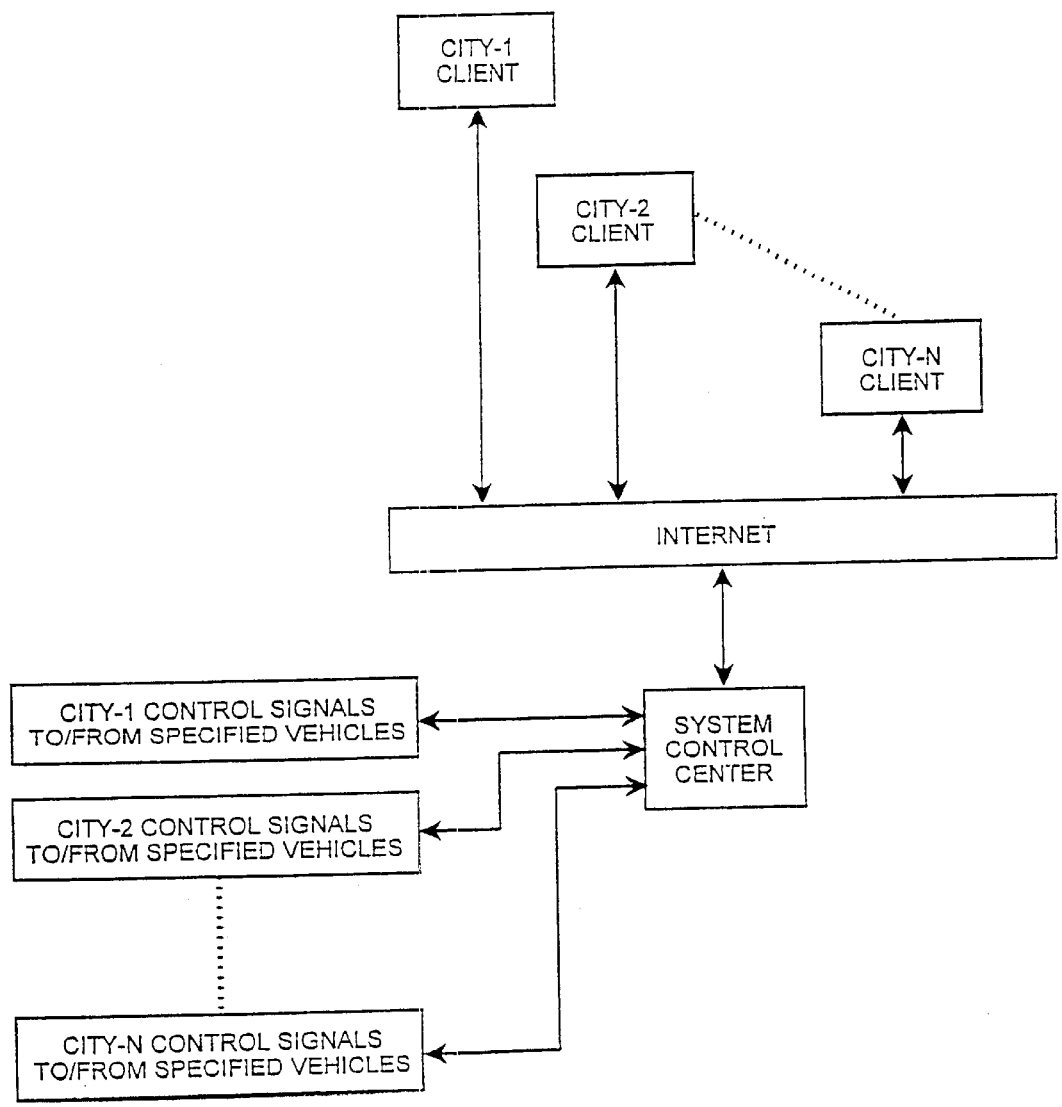
FIG. 3 represents a block diagram illustrating the client system access/control management and control signals/data flow to and from the individual vehicles.

The FIG. 3 block diagram illustrates how clients of the transit management system of the present invention can both access and control their own transit systems through the single centrally located system control center. The data interface between each transit management organization and the system control center will typically be provided at low cost by the Internet.

The FIG. 5 summary chart specifies and illustrates some of the various different types of data which can be transferred from each vehicle within each mobile control system to the system control center. In connection with each data transmission, the time of day and GPS (Global Positioning System) location will always be communicated so that each data transmission will be time tagged to allow for subsequent data processing and analysis.

When the driver reports for duty on a particular transit vehicle, the driver performs a card swipe operation with his own driver transit card to identify himself to the system. After proper authentication by the system control center, an authorized driver is allowed to operate the vehicle. Via appropriate electronic interface circuitry between the MDC and the vehicle engine and engine control systems, the system of the present invention can take a variety of steps to prevent the driver from starting the engine, to shut down the vehicle engine or to prevent brake release. The identification of each vehicle is continuously provided on a real time basis since the bus-mounted MDC represent a dedicated piece of hardware which identifies itself with each burst of data transmitted.

In all applications, a GPS receiver will be provided for each vehicle and interfaced with each MDC to allow the MDC to provide continuous real time position information to the system control center. The data transmitted by the GPS receiver through the MDC to the system control center will typically also include vehicle speed data, direction of travel data and other conventional commercially available forms of data to allow the vehicle position to be mapped in real time both at the system control center as well as at the transit client management location.

As a user boards the bus and performs the card swipe operation on the MDC, a burst of packet data is transmitted to the system control center to communicate at least the card user ID as well as the vehicle entry time and vehicle location. The system control center then determines the appropriate fare to be assessed against the transit user's credit account based on predefined route and fare data as defined by the transit manager.

A key advantage of the present invention is that the fare structure can be accessed and controlled by a transit system management client on a real time basis to specify fare charges based on the day of the week, the time of the day, holidays or special promotions. For example, a transit client may wish to run a special promotion where females over the age of sixty could ride either at no charge or for a reduced fare between twelve P.M. and three P.M. on the first Wednesday of each month. Such customized fare control parameters can be instantaneously formulated at the transit client's Internet interconnected PC terminal, transmitted to the system control center software and take effect immediately. In the past, such fare change notices were manually implemented into even the most state of the art buses having card reader fare assessment systems on board each bus. If the transit client desires, a specially customized message may be displayed on the MDC LCD readout to note both the "ACCEPTED" status of the user's transit card as well as the reason or code name corresponding to the special promotional fare.

A transit manager might also charge a special promotional or reduced fare for affiliated groups such as designated employers, schools, or other organizations which would benefit from reduced rates either at all times or at specified times. These discounts could be correlated with efforts to increase use of a client's mass transit system, to reduce the need for school buses or to subsidize selected categories of transit system customers such as the indigent or physically impaired.

As further summarized in FIG. 5, the real time collection of fare data where a single collected fare corresponds to a single boarding passenger allows transit managers to collect passenger count information and total fare collections in real time on a bus to bus basis.

More sophisticated versions of the present system can offer options to communicate vehicle system operating data such as readouts or graphs of bus speed, measured as a function of time of day, cumulative daily vehicle mileage, vehicle fuel and oil quantity, engine RPM and engine temperature, system failure alerts such as over temperature or low oil pressure, a door position warning indicating a door is open when the vehicle is in motion, safety warning signals falling within a variety of categories and total vehicle weight which would indirectly reflect passenger loading. By interconnecting a video camera to the system MDC, a snapshot capture video signal may be transmitted from the vehicle to the transit client to assist management in verifying bus status, passenger load factor as well as other information communicated most clearly by an image rather than by pure data.

The MDC may be configured to include a keyboard to allow the driver to transmit customized messages to transit management as well as a series of "hot keys" for transmitting predetermined, canned messages such as "driver on break" by requiring the driver to push only a single hot key. Similarly, customized text messages may be formulated by a transit manager, transmitted via the Internet to the system control center and communicated to the MDC of a specified bus on a real time basis. Such messages could be used to notify a driver that his bus was being taken out of service at the next stop due to an engine system malfunction, that the interval between his bus and the next proceeding bus had been reduced to five minutes less than the scheduled time interval or that the driver should contact his manager by telephone at the next stop.

As further noted on the FIG. 5 summary chart, a comprehensive variety of end of day operating data can be summarized by the on board MDC and transmitted via the system control center tq the local transit management operation. Such operating day data summary could include the total passenger count for the day, an hourly breakdown of passenger count, the on-duty/off-duty times for each drivers, the vehicle operating time and mileage for the day, a listing of vehicle system failures and warnings that predefined vehicle operating parameters have been exceeded, passenger demographics showing, for example, how many passengers boarded at each stop and a real time analysis of the vehicle loading and capacity status. Since each bus within each mobile system can be configured to transmit the same end of operating day data summary to the appropriate transit management facility, that facility can completely evaluate the day's operations and fare collections on a real time basis as well as vehicle maintenance requirements.

FIG. 6 summarizes the various classes of data which can be transferred from the system control center to individual vehicles operating within a single mobile system. As discussed above, fare control data can be formulated by the appropriate transit manager and transmitted on a real time basis to the MDC in each vehicle to adjust fares based on the time of day, day of week, holidays or special promotional discounts or other discounts. Promotional fares can be further broken down by customer identification, employer identification, vehicle location entry point or Dy a promotional card sponsor such as customers of McDonalds® or Burger King® restaurants or Mobile® or Chevron® service stations. Special discounts can be provided to individual customers based on volume purchasers or by the user's employment affiliation. Employers may also realize tax incentives from participation in the Federal employee ridership program.

The system can be configured to automatically reconfigure the bus head sign based upon its GPS position data such that when a driver reaches a predetermined location, the head sign indicating the bus destination can be automatically reconfigured or reversed without driver input.

As further noted on the FIG. 6 summary chart, the system control system may be programmed to compare the actual bus position versus time with the scheduled bus position versus time to provide the driver with a real time readout of minutes ahead of schedule or minutes behind schedule to assist the driver in decreasing that unwanted time differential to zero. The system may also provide the driver and the transmit manager with a schedule compliance warning in the event the bus location versus time falls outside a designated maximum allowable time window. Similarly, an excessive vehicle speed warning can be communicated to the transit manager in real time as can an excessive vehicle weight warning. Such data allows the transit manager to take appropriate steps to decrease the passenger load of a predetermined vehicle by providing a second bus to meet an overloaded first bus at a specified meeting point. If a particular bus deviates from a designated route as identified by GPS data, the transit manager can be alerted immediately of a potential problem. If desired, the system can prepare comparative information regarding the schedule compliance of one bus relative to a preceding vehicle or to a following vehicle to assist the bus drivers or the transit manager in ironing out unwanted compression or expansion of bus position. The system will also indicate to management when drivers make unauthorized pickups or drop offs.

When the system of the present invention is utilized for shuttle vans such as airport rental car or hotel vans or for medical transport vehicles for transporting patients from one medical facility to another, managers of such systems can communicate specialized messages directing a shuttle driver to change his route, to pick up a passenger or to provide a listing of future pickups. The GPS/MDC system may be programmed by the transit manager to provide the vehicle driver with either directions or with a map showing the location of a specified pickup point and the best route to proceed from the vehicle's present position to the selected pickup position. The system will also indicate to management when a driver makes an unauthorized pick up or drop off.

FIG. 7 summarizes some but not all of the advantages of the present system from the point of view of transit client management. The system provides transit managers with both real time vehicle location mapping as well as real time vehicle schedule compliance as a result of the real time comparisons between vehicle location and scheduled vehicle location. Real time fare collection data summarizes can be provided by vehicle, by route or by geographic area to substantially facilitate management and operating efficiency enhancements. System capacity utilization can be analyzed based on time of day, day of the week or time of year as can the load factor and load factor changes on a route by route basis. Managers may also utilize the real time data to compare current load factor data with historical load factor data and predict changing trends or observe that trends are not changing. System software can be configured to advise management of route overload warnings, system overload warnings or vehicle overload warnings.

Based on the comprehensive real time data input from each bus within a single transit system, management will be able to observe schedule compliance in real time, to define maximum allowable schedule compliance time windows and to be automatically advised by the system software when those preset time windows have been exceeded.

By comparing real time vehicle passenger boarding statistics with passenger boarding statistics for the same route for the prior day, prior week, prior month or prior year, the system can be programmed to alert management to an imminent vehicle, route or system overload to provide management with an advance overload prediction and an opportunity to attempt to remedy the predicted overload.

By keeping track of the real time position of all vehicles on a route, the interval between two buses following the same route can be monitored and compared with appropriate schedule compliance data. The system can then either automatically or enable management to manually transmit customized messages to the drivers of the conflicting buses to request that they attempt to either increase or decrease the vehicle to vehicle time interval.

Because the vehicle can be configured to transmit maintenance-related data through the MDC to transit management, approaching routine preventative maintenance, mileage points or time intervals can be predicted days or weeks in advance to facilitate vehicle maintenance and scheduling.

The system also allows transit management to issue driver transit cards to allow the MDC to communicate driver information to transit management. The system software can be programmed to cross-check the identification of a scheduled driver with the driver seeking to sign on at a particular vehicle. If the actual driver data does not cross-check with the scheduled driver data, the vehicle ignition system can be disabled either prior to start or prior to allowing the new driver to commence vehicle operation.

Figure 4:
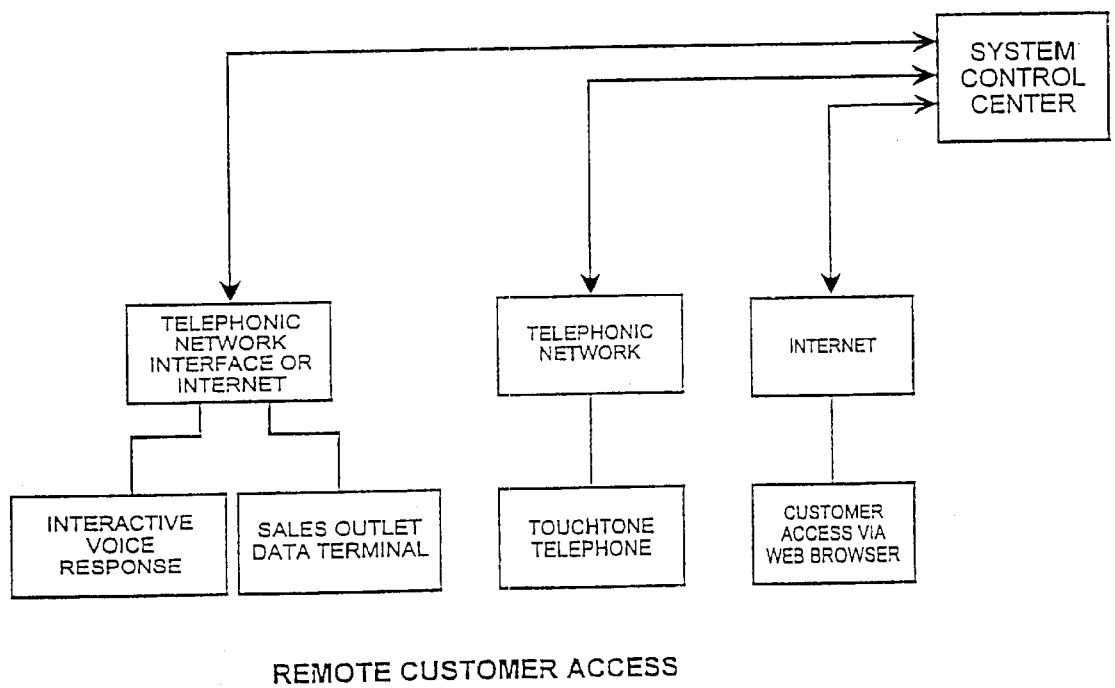
FIG. 4 represents a block diagram illustrating account access and credit card adjustment by a transit card user.

The FIG. 4 diagram illustrates how the system provides for customer database access. As illustrated in that diagram, a customer can access the system control center database using an appropriate PIN number and the user's card number to perform any one of the following functions:

1. Check credit balance;
2. Add credit by charging an additional amount to the customer's commercial credit card;
3. Transfer credit on a first transit card to a different transit card;
4. Deactivate or suspend the activation status of an existing transit card; and
5. Cancel an existing transit card.

These customer control features demonstrate how the transit card dramatically differs from existing smart card products which utilize a microprocessor chip to store data and value on the card itself in that the transit card has no intrinsic value whatsoever. If a customer loses his transit card, he simply contacts the system control center via any of the techniques illustrated in the FIG. 4 diagram and either deactivates or cancels the lost or stolen card. The card deactivation can be accomplished immediately and if an unauthorized user attempts to use the card even within a few seconds later, the bus MDC will be advised by the system control center that the card has been "DECLINED." Even if a particular transit card represents a universal card usable on any transit system anywhere under the control of the system control center, the card will be deactivated and rendered useless in all systems on a simultaneous basis.

As further indicated in the FIG. 4 diagram, transit cards can either be sold or have the existing account credit balance increased by authorized sales outlets having data terminals configured to communicate with the database stored at the system control center. Such data terminals can either be connected to the system control center by standard telephone lines, by Internet, or by wireless CDPD modem.

Referring now to FIGS. 8, 9, 10 and 11, the hardware and specific software contemplated for use in connection with the preferred embodiment of the invention will now be described.

Figure 8:
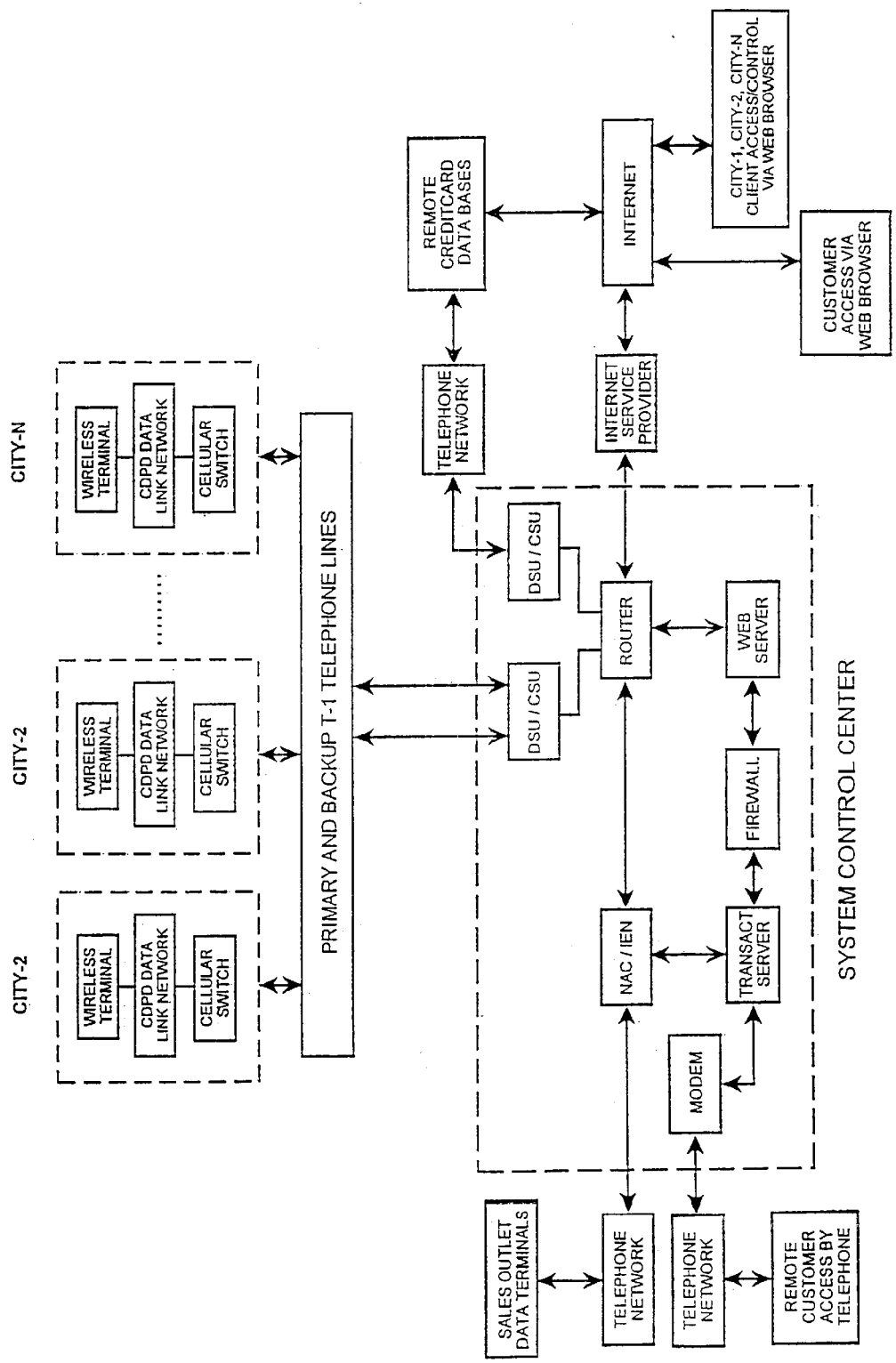
FIG. 8 represents a more detailed block diagram of one embodiment of the transit management control system of the present invention.
Figure 9:
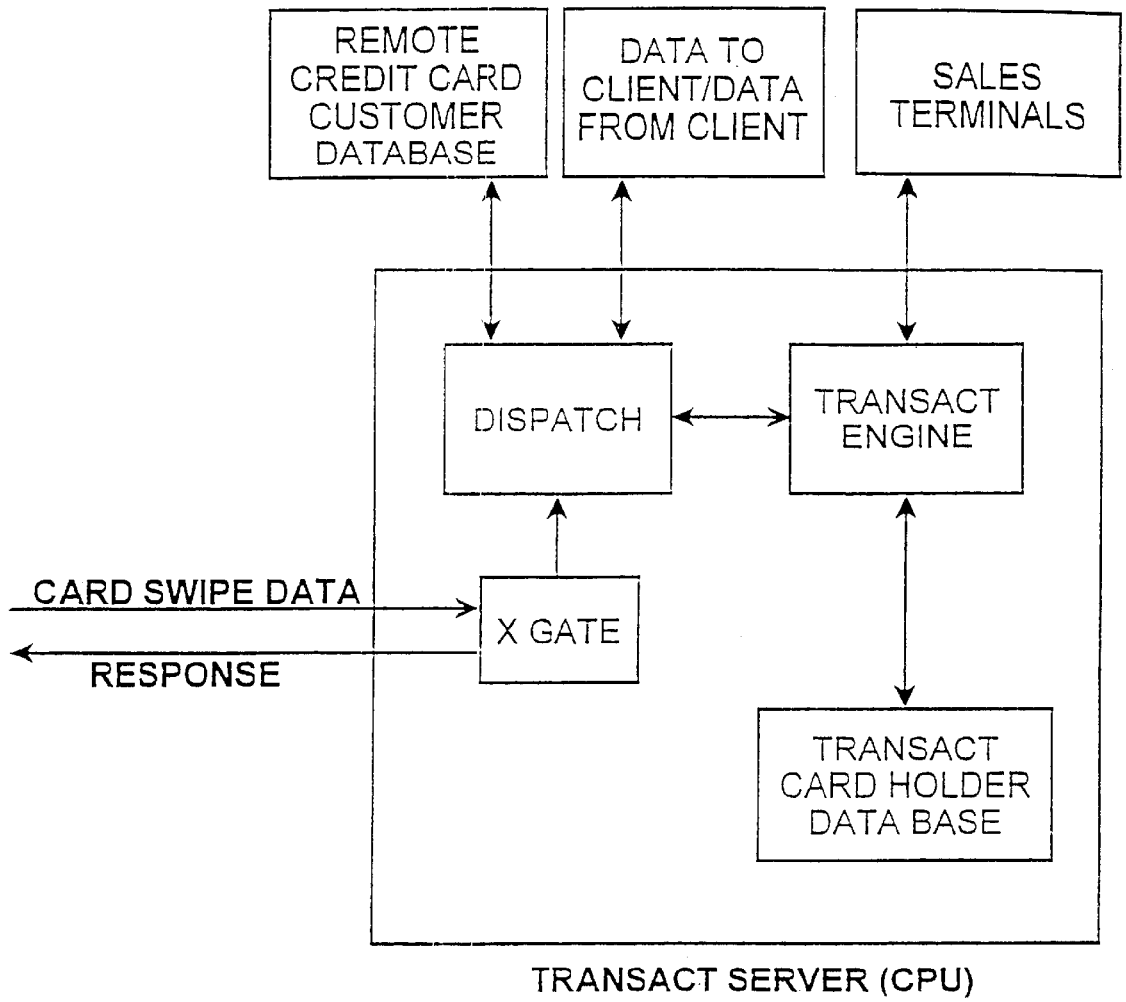
FIG. 9 represents an expanded block diagram of the Tranz:Act Server illustrated in FIG. 8.
Figure 12:
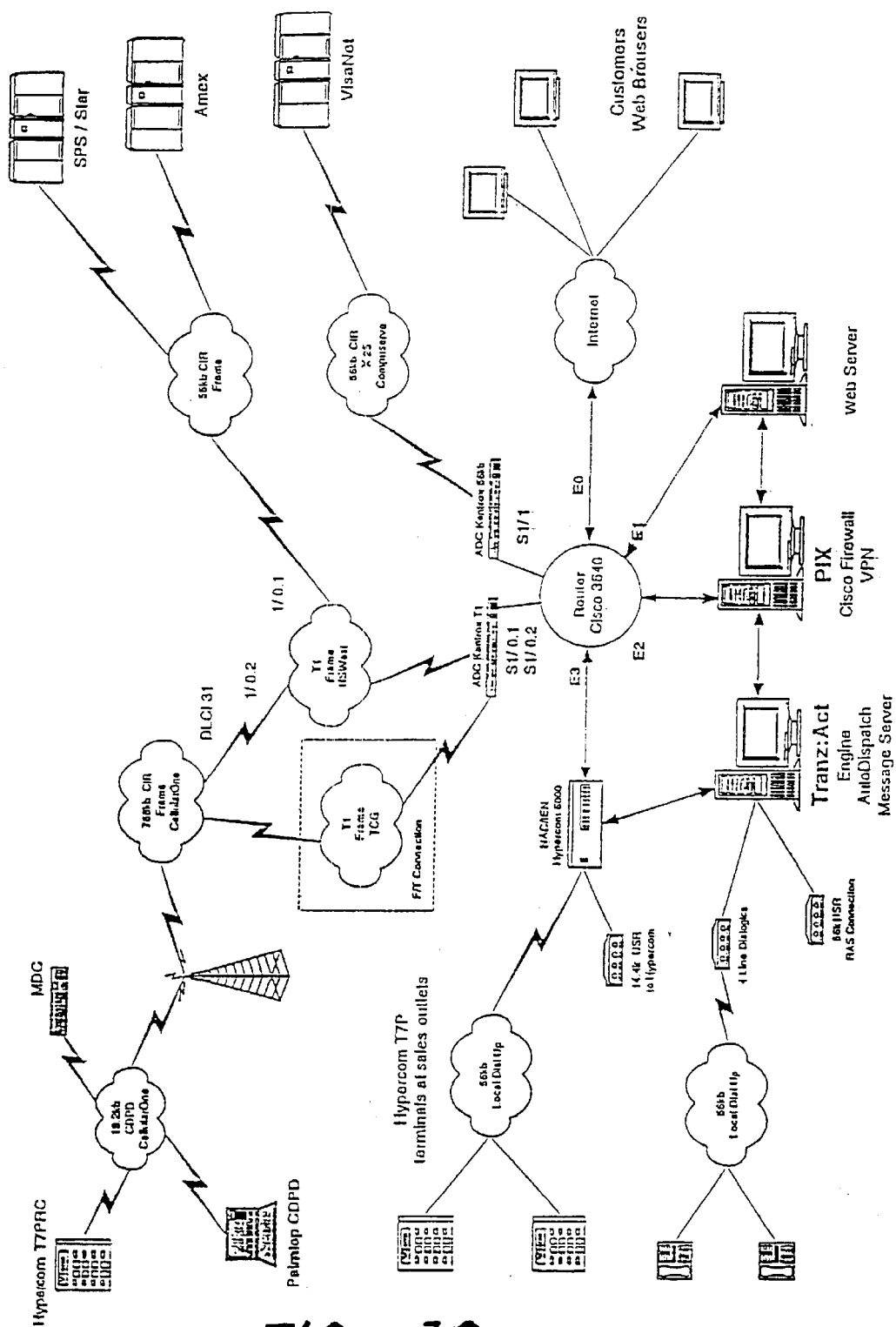
FIG. 12 represents a generalized block diagram of another embodiment of the invention illustrating certain specific items of system hardware.
Figure 13:
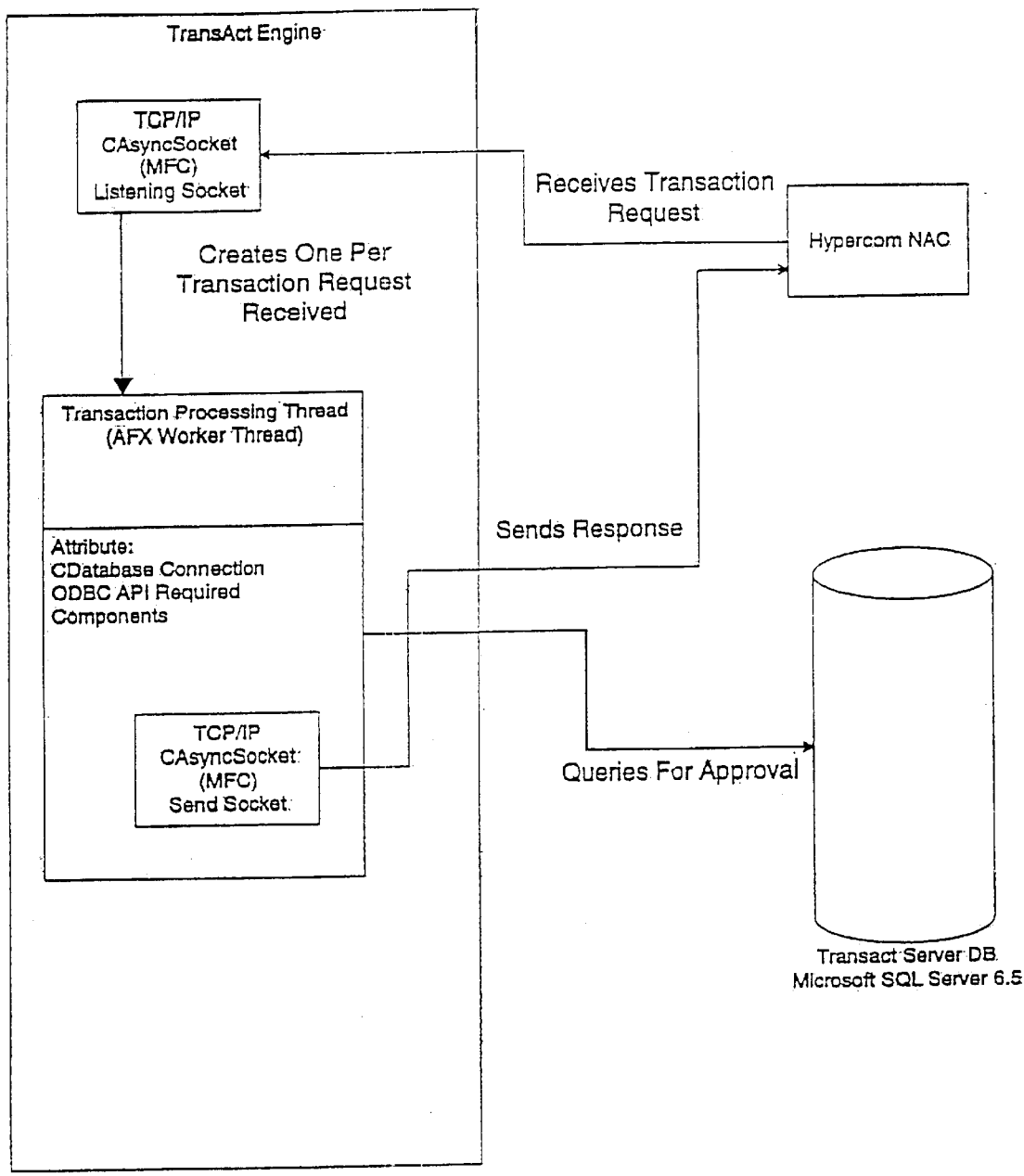
FIG. 13 represents a block diagram representation of various software features of the invention.
Figure 14:
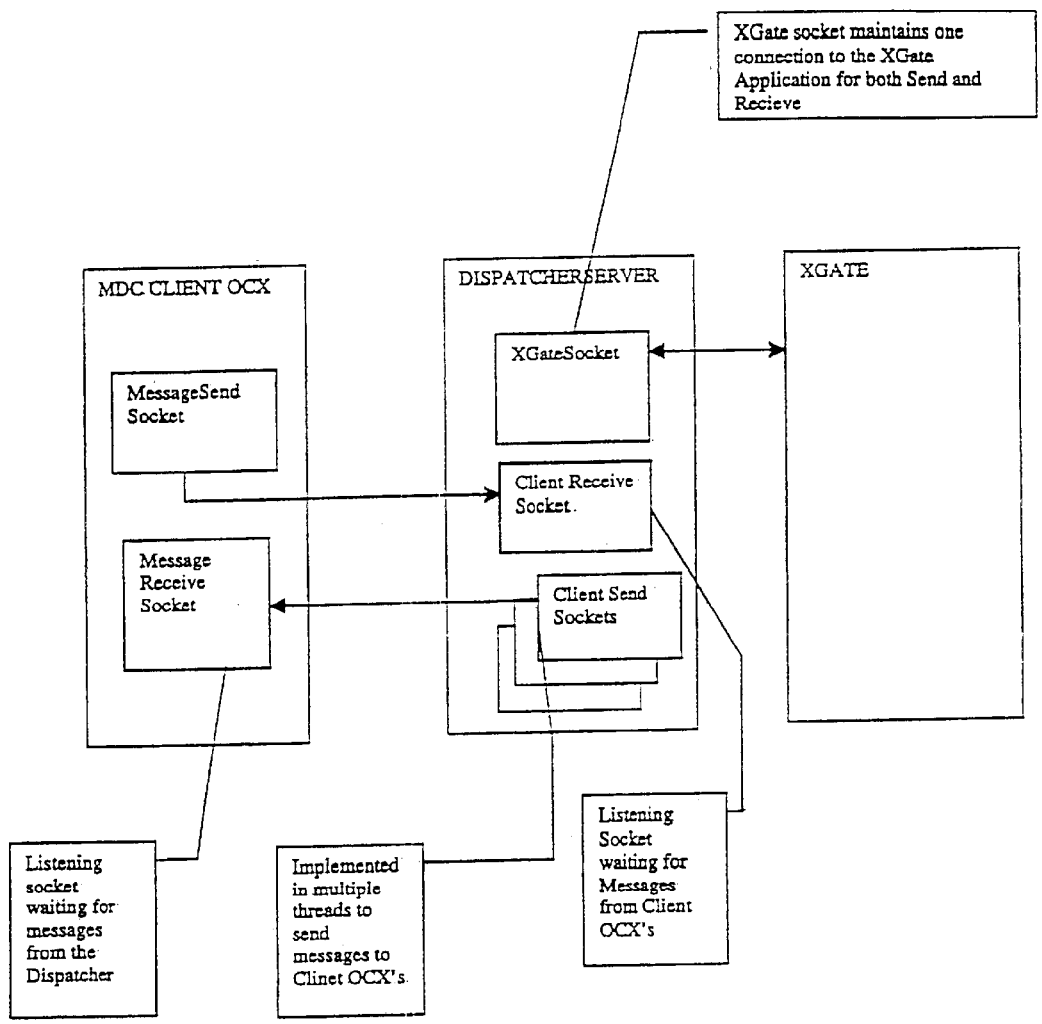
FIG. 14 represents a software related flow chart according to the present invention.
Figure 15:
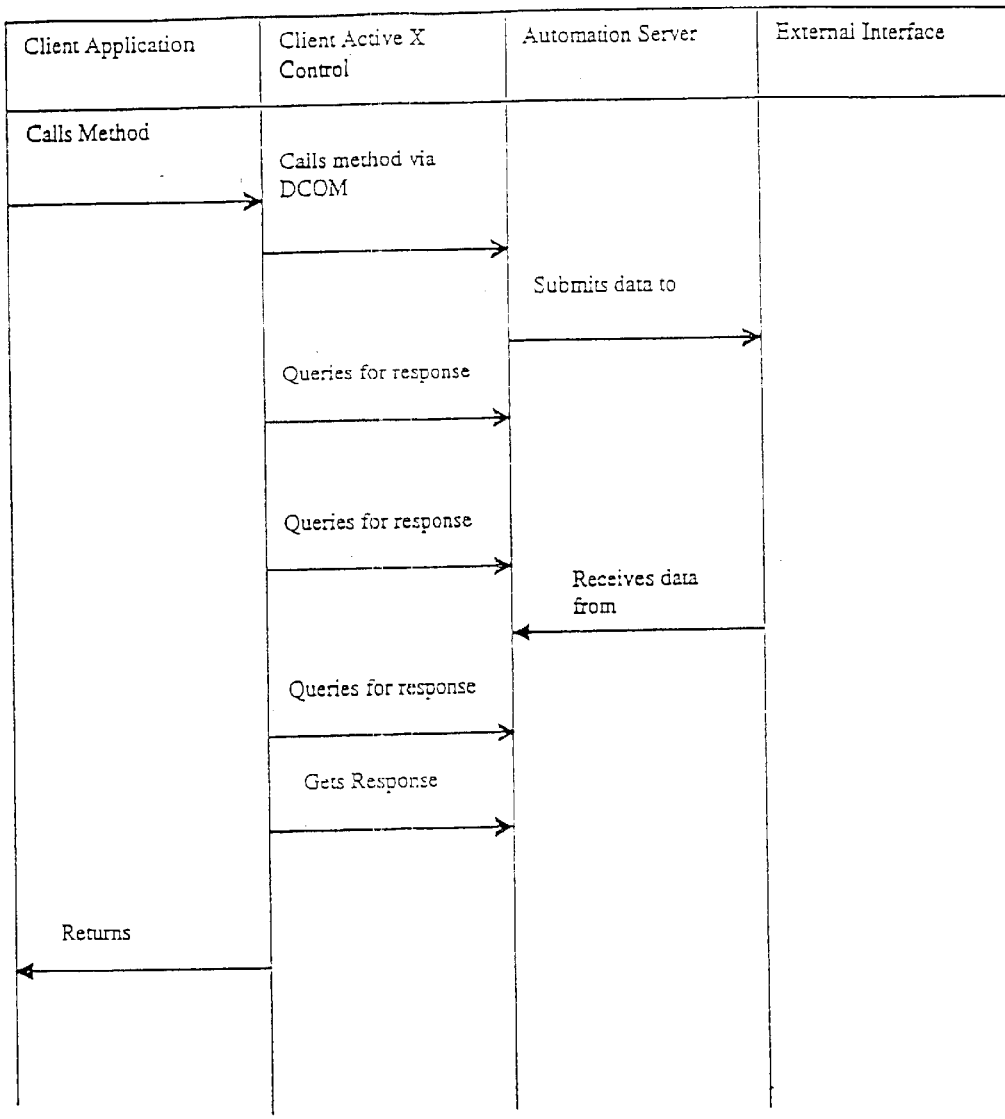
FIG. 15 represents a diagram relating to the software call to automation server blocking method.
Figure 16:
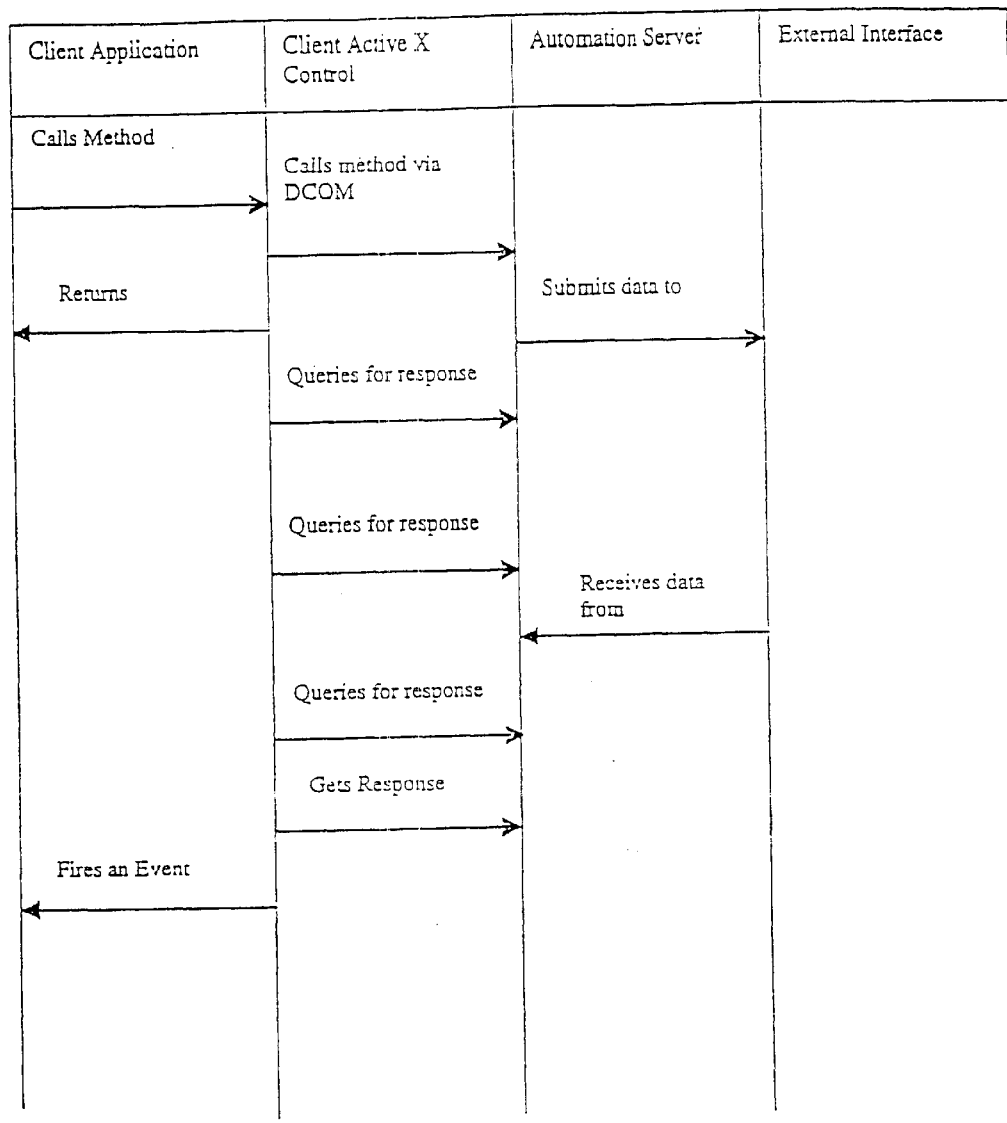
FIG. 16 represents a diagram relating to the software call to automation server non-blocking method.

The overall system diagram illustrated in FIG. 8 coordinates with and is consistent with the general system diagram illustrated in FIGS. 1, 2, 3 and 4. FIG. 12 generally corresponds to the FIG. 8 block diagram and more specifically designates the manufacturer and model number of certain elements of the invention utilized within the block diagram of FIG. 8 designated as the system control center. As illustrated in the FIG. 8 block diagram, the heart of the system control center is designated as the Tranz:Act Server. FIG. 9 illustrates the XGate, Dispatch, Tranz:Act Engine and Tranz:Act card holder database which are implemented by software applications within a conventional network server. FIG. 9 illustrates that the incoming card swipe data is communicated from a particular bus to the XGate system element where the data is converted from its encrypted form into a standardized data format identifying the card number and the amount charged. The System may be configured to accept and transmit additional statistics or survey data as an element of the card swipe data. As explained above, the data response transmitted by the Tranz:Act Server to the system MDC communicates either an "ACCEPTED," status or a "DECLINED" status. An "ACTIVATE" status represents a different form of information which is communicated to a sales outlet data terminal in response to a card sale or credit enhancement transaction.

The FIG. 10 diagram indicates the format of a typical data sequence which might be used to implement a system according to the present invention. Typically, either an ISO or AAMVA data format will be used for standardization purposes.

The software based Dispatch element receives the converted card swipe data from the XGate element and performs analysis of the first four bytes of the incoming MDC data. Those first four bytes are used to identify the received data into one of the following categories:

1. Card swipe data;
2. GPS position information;
3. Driver sign on;
4. Driver sign off;
5. Hot key messages;
6. Custom text messages;
7. End of day data summary.

The foregoing list is not all-inclusive, but is provided merely to illustrate the function of the Dispatch element of the Tranz:Act Server.

Figure 11:
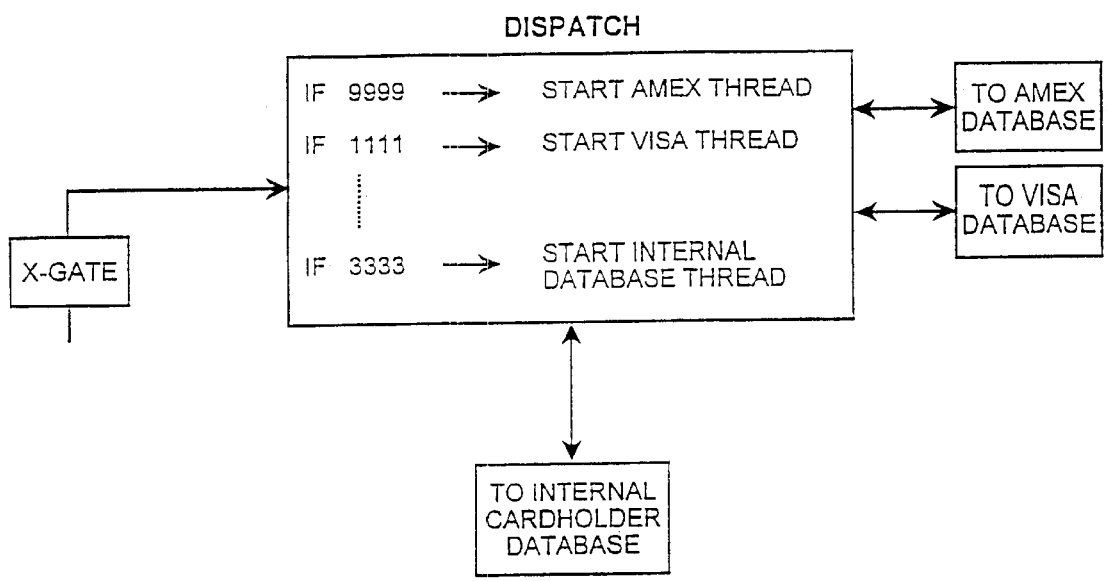
FIG. 11 illustrates the operation of the Dispatch element of the Tranz:Act Server illustrated in FIG. 8.

FIG. 11 illustrates a situation where the first four bytes of MDC data correspond to card swipe data and demonstrates how the Dispatch element of the invention functions to parse the data into an appropriate category. As will be explained below, the particular card swipe data content may inform the Dispatch element that the card swipe data is an American Express card, a VISA card or some other commercial credit card. The Dispatch element responds to that commercial credit card identification by sending the card swipe data to the remote credit card customer database as illustrated in the FIG. 2 block diagram to identify the card user and card credit status. As illustrated in FIG. 11, a particular data content such as, for example, "3333" can be used to designate to the Dispatch element that the card swipe data has designated a proprietary transit card where the relevant data is found within the transit user database stored in the Tranz:Act Server as illustrated in FIGS. 2 and 9.

In the preferred embodiment of the invention, the Tranz:Act Server database search engine takes the form of Microsoft SQL Server V6.5. Each incoming fare assessment transaction is configured in software as a separate program referred to in the software art as a "thread." Each thread receives the incoming card swipe data and performs a separate search process independent of all ongoing or subsequently received search processes. Each new incoming transaction starts a new thread. The transit user database is configured within the Microsoft SQL database into four separate columns designated Column 1, Column 2, Column 3 and Column 4. Each thread is configured to perform a parallel search of each column simultaneously resulting in nearly instantaneous search completion where the response of a search of a one million record database can be achieved in less than one millisecond. The implementation of such a thread database processing routine allows essentially an unlimited number of transaction to be processed simultaneously by the server on the transit user database with a less than one millisecond response time for each inquiry.

When the transit card user number being searched for is located, the credit status is evaluated and compared with the amount to be charged. If the credit on account exceeds the amount to be charged, the system software generates "ACCEPTED" output which is immediately transmitted to the bus MDC. At the same time, the database software reduces the customer's credit balance by the amount of the fare charge. As part of this database search, the time of the inquiry is recorded and the software compares the time of the current search with the time of the last data transaction relating to that same record. If the time differential between those two record access times is less than a predetermined time window such as one hour, the system will assume that the user is implementing a bus to bus transfer which is typically processed as a no-charge transaction. In such cases, the card user's credit balance is not reduced.

In response to an MDC card swipe, the system of the present invention can accomplish all data transmission and database search activity and retransmit a response to the bus MDC in a period typically no longer than about one second. When the card swipe data corresponds to a non-proprietary commercial credit card and the system is required to access a remote credit card customer database, the processing time will be increased from one second or less to a time on the order of about two to four seconds. From the standpoint of the bus operator and passenger, the response to a card swipe is essentially instantaneous.

The FIGS. 13, 14, 15 and 16 diagrams further describe and illustrate the preferred embodiment of the software used to implement the preferred embodiment of the invention. Approximately two gigabytes of the server hard drive is allocated in the prototype system for use by the Microsoft SQL server software and its database.

The basic embodiment of the present invention actually tested to date provides only two tables within the SQL software: the CardHolderInfo and CardInfo tables. The CardHolderInfo table contains information about the card holder such as: card holder name, address, phone number, etc . . . The CardHolderInfo table is keyed to an unique integer value for each record in the table. This table has a relationship to key in the CardInfo table. This table is used to obtain information about the card holder. The CardInfo table contains the card number, the available balance and key to the CardHolderInfo table. The card number is stored as four sequences of integers which accommodates standard sixteen character card numbers as well as any other type of card number. The four integer sequences are stored as clustered key values to increase the search speed. The database is tuned to allow the MaxNumber of worker threads to be matched to available RAM on the server. Available connections is presently set at 302.

The Tranz:Act Engine currently uses Microsoft Visual C++ Version 5.0 and is referred to as a Microsoft Foundation Class based Dialog application. The software supports only one main window with a limited user interface.

As the Tranz:Act Engine is started, an IP connection is established with the Hypercom NAC/IEN box. Also, database connections to the Tranz:Act Server Database are allocated. Three hundred connections have been allocated for the prototype system. The Tranz:Act Engine maintains a TCP/IP connection to the Hypercom NAC/IEN box. The TCP/IP session is maintain using the MFC (Microsoft Foundation Class) CAsycronousSocket Class. As data is received over the IP Connection, the data is parsed. After the parsing is complete, a new thread is started.

For each new thread that is started, a connection to the database is passed to thread. Each thread takes the parsed data and performs a database select. The select is based on the Card Number sequences. For example, SELECT balance FROM CardHolderInfo WHERE CardNum_Seq1=1111 AND CardNum_Seq2=2222 AND CardNum_Seq3=3333 AND CardNum_Seq4=4444. This select statement is very fast using the low level ODBC Direct calls instead of any other types of API's such as MFC ODBC, ADO or DAO. Once the Balance has been retrieved, a simple check is done on the transaction and the acceptance or decline status is sent over a new separate IP connection. The database table is then updated.

Although each new thread is instantiated on the STACK, the data that is parsed and passed to threads is allocated on the HEAP which increases the speed of the systems. All required elements for the database connections are acquired at startup time. This includes the HANDLE to the statement (HSTMT) and the database connection which makes database access very rapid.

As illustrated in the FIG. 13–FIG. 16 diagrams, the system utilizes a variety of sockets. The Dispatch Client OCX or .exe Message Send Socket is configured as follows: This socket will open a connection to the Dispatch Server Client Receive Socket. The data sent by this socket will be provided via a public interface from the OCX or .exe. The public interface will be exposed to a client application. Once the data has been provided, it will be sent to the Dispatcher Client Receive Socket and the socket connection will be closed by the MDC Client OCX or .exe Send Socket. Before the data is sent over this socket connection it will be formatted via the OCX or .exe to the acceptable XGate software excluding the job number which will be furnished by the Dispatch server application.

The MDC Client OCX or .exe Messages Receive Socket is configured as follows: This socket will be opened and listening at all times. It will receive data from the Dispatch Server Client Send Socket. The Dispatch Server Client Socket will close the connection once the data has been sent. The data will be the raw data received from the XGate application. This data will be parsed by the MDC Client OCX or .exe and made available via a public interface method/event.

The Dispatch Server XGate Socket is configured as follows: This socket will be connected to the XGate application at all times the Dispatch Server application is running. This socket will be used for both receiving and sending messages to the XGate application. The only parsing of the data received will be for the Unit Number. The Unit Number received from XGate will be mapped to an IP address corresponding to a Dispatch Client OCX or .exe. Once the Unit Number has been parsed, the Dispatch Server will instantiate a new thread. The thread will create a separate Client Send Socket.

The Dispatch Client Send Socket is configured as follows: A new Dispatcher Client Send Socket will be created for each message received from the XGate application. This socket will send the raw message to the appropriate Dispatch Client OCX or .exe Receive Socket. Once the data has been sent, this socket will close the connection.

The Dispatch Client Receive Socket is configured as follows: This socket will listen to accept connections at all times the Dispatch Server application is running. It will receive data correctly formatted to pass off to XGate application. Once a complete message has been received from a Dispatch Client Send Socket, it will be sent to the XGate application via the Dispatch Server XGate Socket.

In connection with an authorized vendor's sale of a transit card as outlined in the FIG. 4 block diagram, the Tranz:Act Engine will receive card swipe data from the merchant. As illustrated in FIG. 9, the Tranz:Act Engine will identify the IP address of the card swipe terminal as a "merchant" terminal as distinguished from a vehicle-mounted MDC. The system will then process the transaction as a transit card purchase by activating the account number of the pre-encoded number on the transit card being sold. The initial card credit balance is keyed in by the merchant along with a PIN number and custom defined information as required by the merchant or by the transit authority.

The merchant terminal utilizes a card reader which decodes the card swipe data stored in the FIG. 10A ISO data format and directly transmits that ISO format data either by land line or by wireless CDPD modem to the NAC/IEN box depicted in the FIG. 12 system diagram. When the Tranz:Act Engine receives such FIG. 10A ISO format data, the system is configured to bypass the XGate and Dispatch elements and directly process the ISO format data.

The foregoing explanation clearly demonstrates the nearly instantaneous real time operation of the present invention which allows a mobile transit vehicle to receive passengers using transit cards which essentially instantaneously communicates the "ACCEPT" or "DECLINED" status of the transit card via the bus MDC. Through appropriate security measures, the holder of a transit card can conveniently access his account maintained on the system control center database to determine its current credit balance, to add credit or to deactivate the card. Transit management is provided on a real time basis with comprehensive data and analysis regarding every one of its vehicles within its system by accessing and receiving data from a single centrally located Internet-connected system control center. All data and data analysis is accomplished by software on a real time basis rather than by wage earning employees and the system is maintained operational at relatively low cost on a twenty-four hour by seven day basis. The transit system pays a fee for use of the present system on a per-transaction basis or, alternatively, on the basis of a pre-negotiated fixed fee per month, per quarter or per year. Both an unlimited number of buses as well as an unlimited number of transit systems can be operated and managed by means of a single system control center.

Using the same system elements and software, the system of the present invention can be readily adapted to other analogous uses. For example, the system can be adapted to function as a wireless airliner arrival and departure tracking system by providing an MDC at airline terminal gates and providing the flight crew with the airline counterpart of a transit card to allow the system to identify the airline company and the flight number corresponding to a particular aircraft and crew. The wireless MDC transmits the card data supplemented by time of day and gate location data to advise airline management in real time via the Internet of the exact flight arrival and departure information for all aircraft within its entire potentially global route system.

The system of the present invention may also be readily adapted for use with crew shuttles, delivery trucks, tour coaches and rental cars and trucks. For the rental vehicle application, a renter may use either a prepaid or a post pay card to check out and check in rental vehicles. The vehicle-based MDC allows the system to automatically monitor vehicle location, mileage driven, and other data in real time. The rental vehicle check-in process may be fully automated by having the customer swipe his card through the vehicle MDC. The software can readily be configured to advise management when a rented vehicle is approaching the pre-designated vehicle turn-in location or where a rented vehicle is located at the scheduled turn in time to provide advance notice that a rented vehicle will either be turned in early, on time or late. Rental vehicle utilization rates may be substantially increased as a result of such real time vehicle location data.

Alternatively, the above mentioned embodiments may be based on a non-card reading system. In this embodiment, a push button wireless MDC device maybe used. This embodiment will work in a similar manner as previously described. For example, if used in a bus shuttle environment, the pushing of the button will transmits data requesting a location and time till the next bus shuttle will arrive. The vehicle-based MDC allows the system to automatically monitor vehicle location, mileage driven, and other data in real time. Multiple buttons could be used to transmit different requests for real time data.

Figure 17:
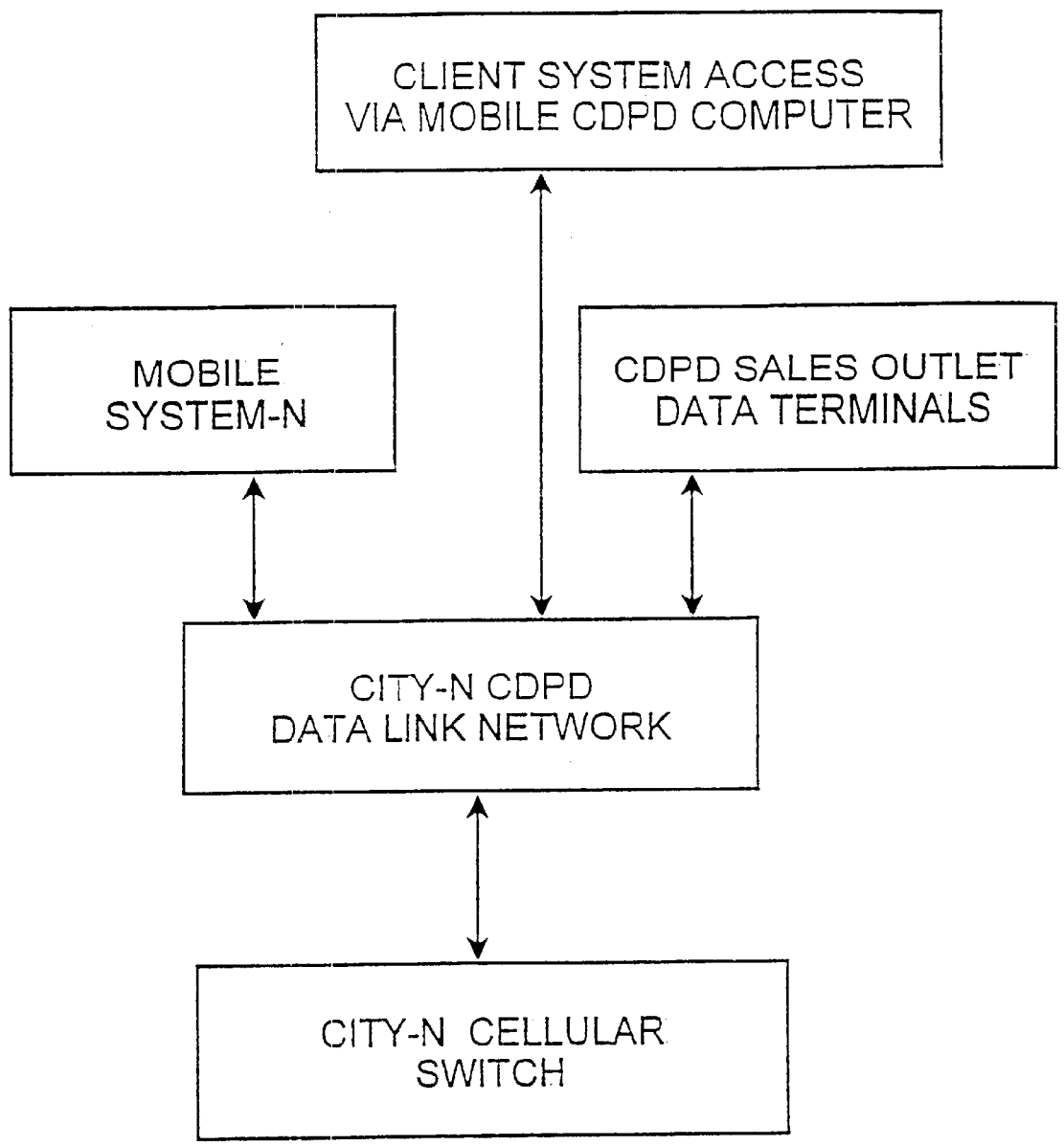
FIG. 17 represents a block diagram illustrating a modification of the system according to the present invention.

The system of the present invention can not only be used in connection with transit systems, but may also be readily adapted to a wide variety of smaller, less complex transit providers including airport rental car shuttle services, airport hotel shuttle services and medical transport vehicles. The FIG. 17 block diagram illustrates yet another modification or variation of the inventive system where transit client management can utilize a mobile CDPD miniature or laptop computer to access the system control center rather than relying upon a hardwired connection to the Internet. Satellite based RF data link systems such as the proposed Teledesic system can also be used to link the mobile system elements to the system control center. Although the present invention has been described in connection with the use of prepaid transit cards, the system can readily accommodate post pay cards and incorporate a conventional periodic customer billing system based on actual card usage. Numerous additional variations and modifications of the system of the present invention would be readily apparent to one of ordinary skill in the art.

2. The REMOTE SMARTCARD®

FIGS. 1–17 illustrate the initial embodiment of the invention as applied to the real time, Internet-based transit management and control system using a wireless vehicular data link. The second, subsequently developed, broader embodiment of the invention encompasses an Internet-based zero intrinsic value smart card where the value data associated with the card is not carried on the card, but is instead accessed in real time from a remote database. This broader embodiment of the applicant's invention is identified by the trademark REMOTE SMARTCARD™ and will be periodically referred to by that shorthand trademark reference.

Figure 18:
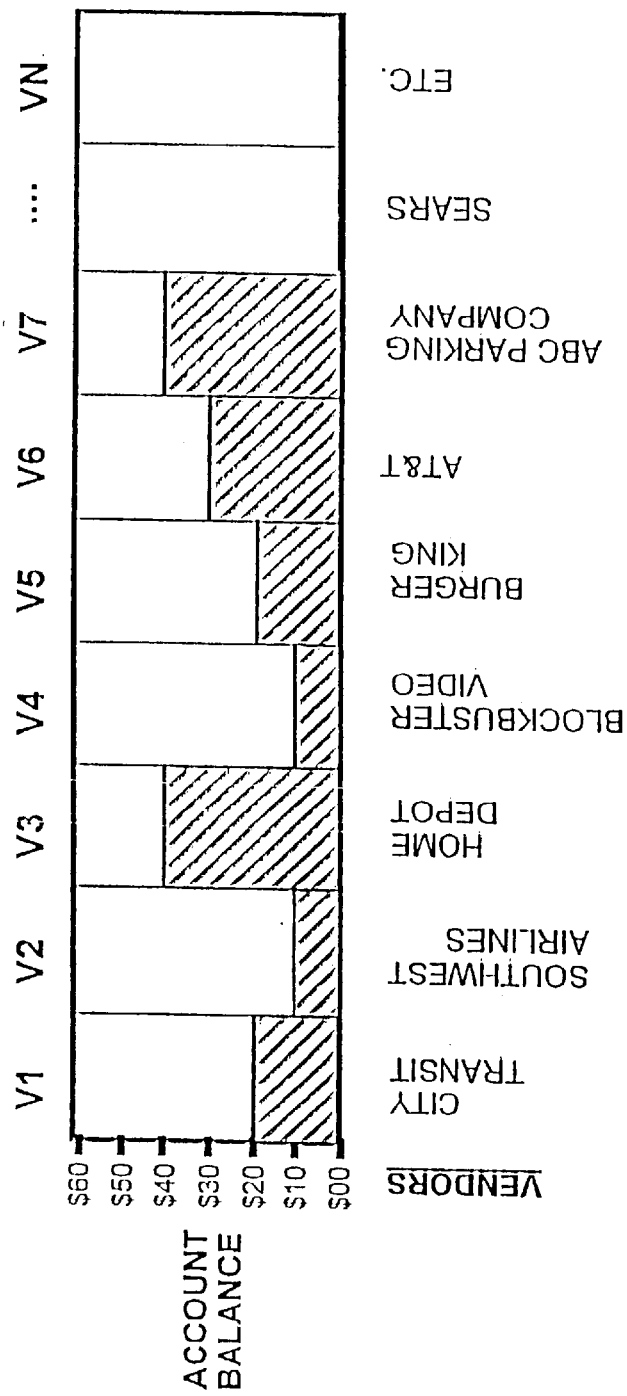
FIG. 18 represents a diagram represents a diagram illustrating a representative customer subaccount balance distribution.

As illustrated in the FIG. 18 diagram, the REMOTE SMARTCARD™ embodiment of the invention can include account balance data corresponding to credit balances capable of being applied to either services or products purchased from as few as one vendor to as many as an essentially infinite number of vendors. Each of these discrete account credit balances represents a customer "subaccount" or "purse" which allows a particular customer to use his specifically issued REMOTE SMARTCARD™ for the purpose of paying for services or merchandise supplied by a wide variety of vendors. In the FIG. 18 chart, a wide variety of vendors have been identified to assist in explaining the configuration of the REMOTE SMARTCARD™ invention and its use as viewed from the standpoint of the customer/card holder, the vendors and transaction processing "merchants." The FIG. 19 diagram illustrates how a customer/cardholder can add value to a designated subaccount.

Figure 19:
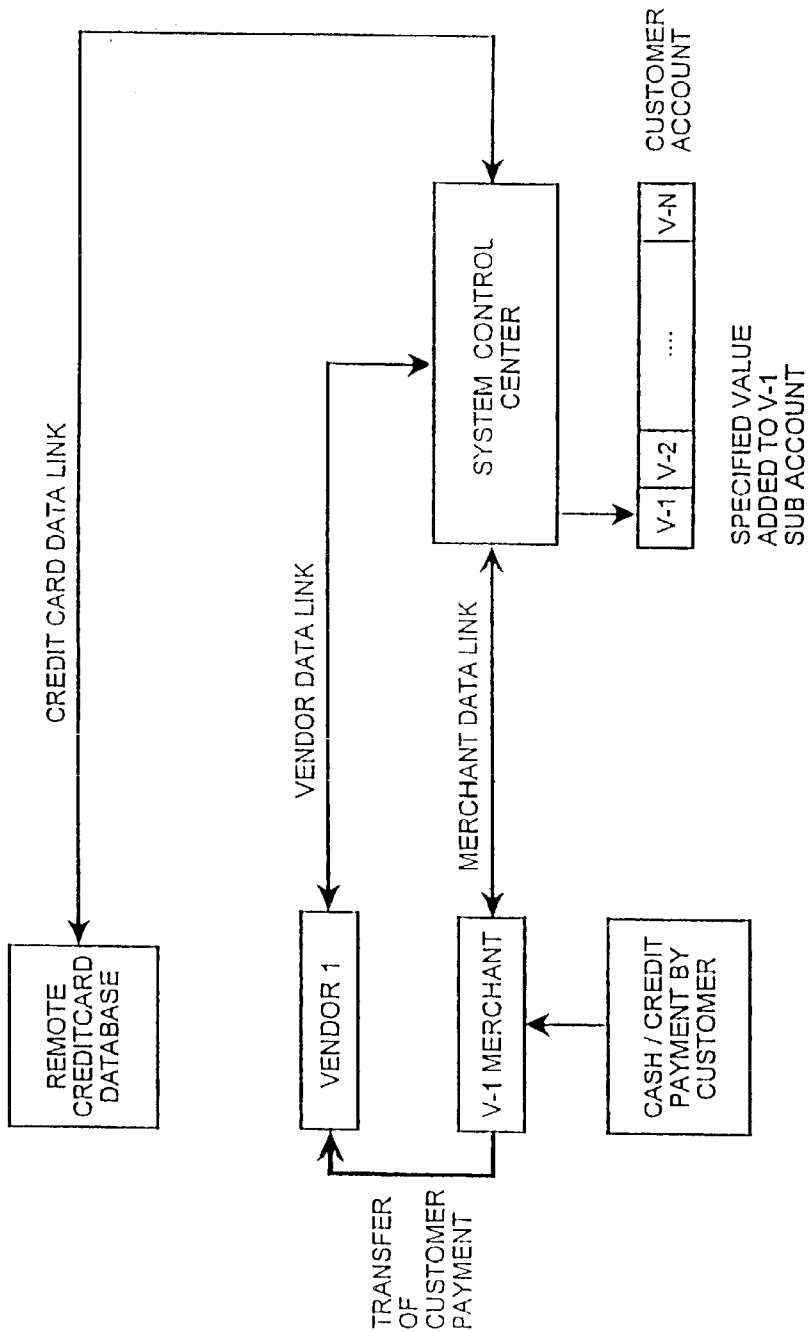
FIG. 19 illustrates a system configuration diagram explaining the addition of value to a defined customer's subaccount.

As illustrated in FIGS. 18 and 19, Vendor-1, abbreviated "V-1," might correspond to a city transit provider such as Phoenix Transit of Phoenix, Arizona. An existing holder of city transit REMOTE SMARTCARD™ visits an authorized V-1 "merchant" which might take the form of a special purpose kiosk for both issuing transit-related REMOTE SMARTCARD™ products or for adding value to such REMOTE SMARTCARDS™. The FIG. 19 diagram assumes that the customer already possesses a REMOTE SMARTCARD™ and wishes to add value to the V-1 account for the purpose of receiving additional services from the city transit organization. The customer either pays the V-1 merchant the amount to be credited in cash, or by check or credit card. The merchant swipes the customer's REMOTE SMARTCARD™ through a conventional card reader which includes a keypad adaptable to indicating the amount of credit to be added to the customer's REMOTE SMARTCARD™ V-1 account. If the customer wishes to charge this transaction to his credit card, FIG. 19 illustrates that, as explained in detail above in connection with FIG. 2, a remote credit card database is accessed via what has been labeled in FIG. 19 as the "credit card data link," a data transfer operation requiring approximately an additional four second processing time. When the system control center receives confirmation from the remote credit card database that the requested amount of credit is available on the customer's conventional credit card (e.g., VISA, MasterCard), the system control center internally credits the specified value to the customer's V-1 subaccount and transmits an appropriate signal over the merchant data link to the V-1 merchant indicating that the requested amount of credit has been added to the customer's V-1 subaccount. When a cash or a cash equivalent transaction (e.g., personal check) is implemented between the customer and V-1 merchant, the system control center processing time is reduced to a time interval of less than one second since use of the credit card data link is not involved in the transaction. At the conclusion of this customer/merchant transaction, the system control center customer account database is updated and that updated account information can be accessed directly by the vendor via the vendor data link.

As illustrated in FIG. 19, the subsequent transfer of the cash or cash equivalent customer payments by the customer to the V-1 merchant takes place between the V-1 merchant and Vendor-1. Where the V-1 merchant is owned outright by Vendor-1, this customer funds transfer can be accomplished internally. If the V-1 merchant is an independent contractor, the merchant may be allowed to maintain the control of the customer funds received for an agreed period of time. The funds may by agreement be transferred between the V-1 merchant and Vendor-1 on a daily or weekly basis or on another mutually agreed basis.

Because the system control center maintains continuously updated customer account balance data and tracks the funds received by all merchants, Vendor-1 may issue periodic billings to all authorized V-1 merchants based on the funds received information generated by the system control center.

For customer funds received via credit card charges, Vendor-1 can make arrangements to receive credit card derived payments either from the V-1 merchants or directly from the credit card providers.

Figure 20:
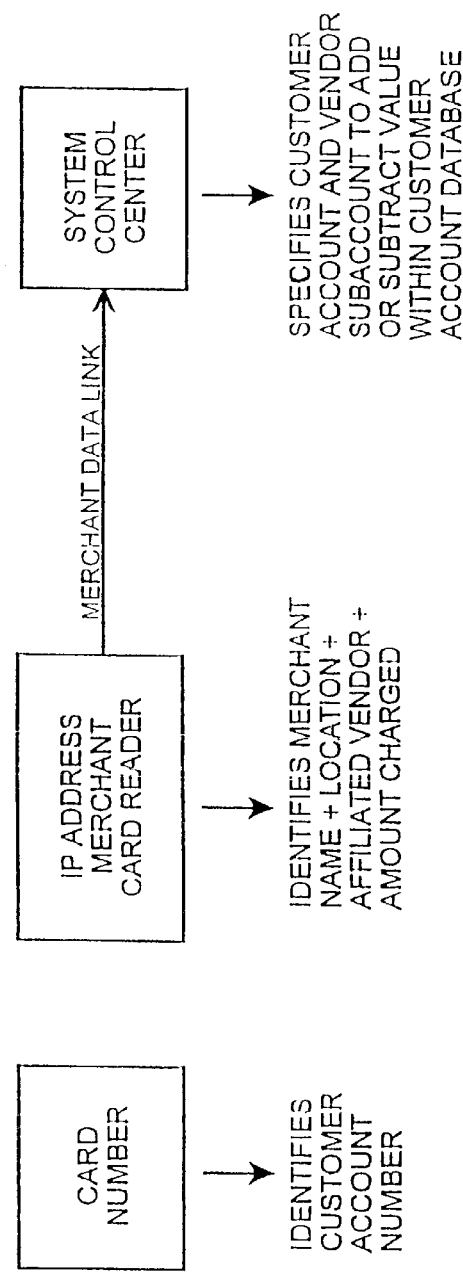
FIG. 20 represents a diagram illustrating how a card number in combination with the IP address of a merchant card reader designates a specific customer account and vendor subaccount.

The FIG. 20 diagram illustrates that as a direct result of the card swipe operation performed by an authorized merchant, the system control center receives data specifying the customer's card or account number as well as the merchant IP which indirectly specifies the identity of the vendor affiliated with that merchant. The card number/merchant IP address data specifies a single customer account and a single vendor subaccount within the system's overall customer account database to either add or subtract a specified transaction amount value.

Figure 21:
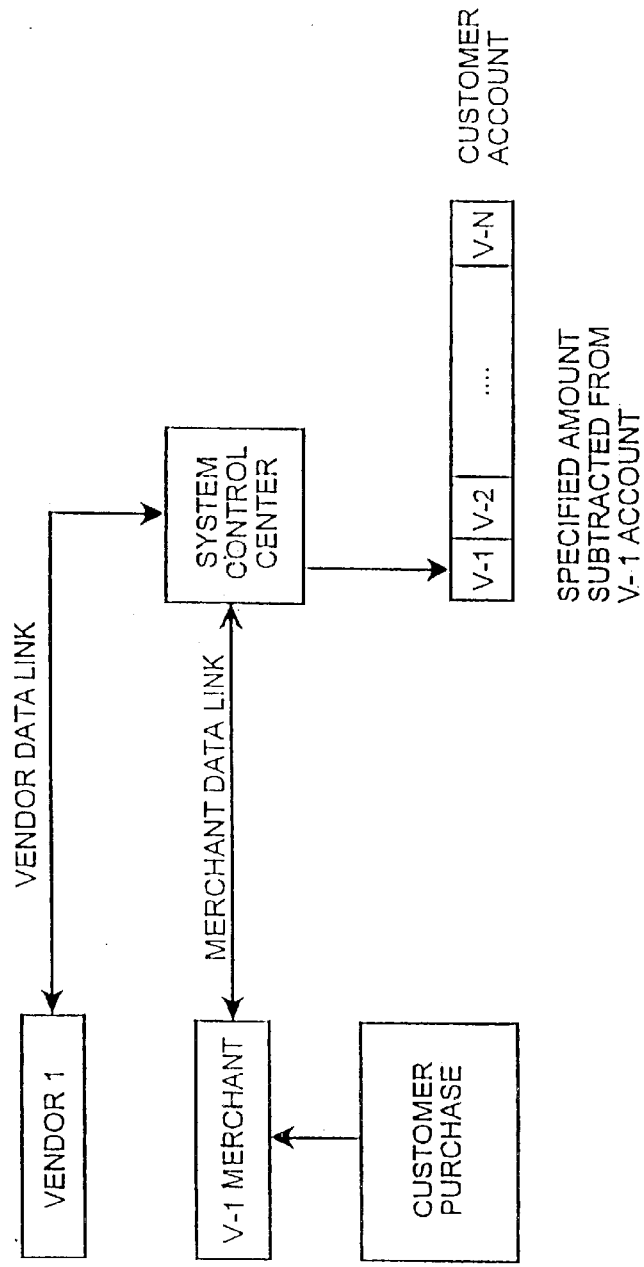
FIG. 21 represents a diagram illustrating how a customer's subaccount is debited at the time of purchase.

The FIG. 21 diagram illustrates how a particular customer's subaccount is debited when the customer purchases a service (e.g., a bus ride) or merchandise. The V-1 merchant either manually or electronically enters into its card reader the amount of the purchase. In response to the card swipe performed with the customer's REMOTE SMARTCARD™, appropriate data is transmitted to the system control center via the merchant data link which results in a specified amount of credit being subtracted from the designated customer's V-1 subaccount. If the amount of credit remaining in the customer's designated subaccount exceeds the amount charged, the merchant's card reader displays "ACCEPTED." If the customer's subaccount credit balance is insufficient, the system control center causes the merchant's card reader to display the message "DECLINED."

Figure 22:
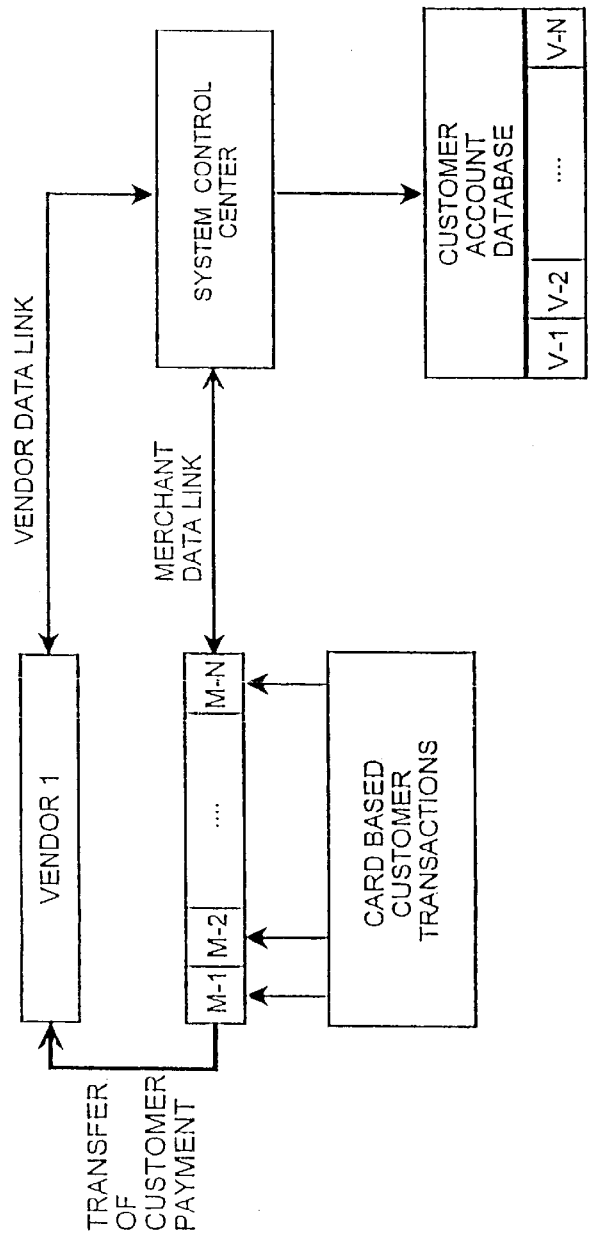
FIG. 22 represents a diagram illustrating the configuration of a vendor authorized merchant network.

As illustrated in the FIG. 22 diagram, a single vendor will typically operate through a plurality of geographically dispersed authorized merchants designated in FIG. 22 as M-1, M-2 . . . M-N. This merchant network system operates exactly as explained above in connection with the FIG. 18–FIG. 21 diagrams except that each authorized merchant can accept customer credit or debit transactions on behalf of Vendor-1. Because as illustrated in FIG. 18, the system of the present invention can accommodate a virtually unlimited number of vendor accounts, the single vendor FIG. 22 diagram should be visualized as being extrapolated to encompass a plurality of vendors.

Based on the configuration of the system control center and pursuant to the terms of agreements between vendors and merchants, the FIG. 22 system configuration may be configured to encompass a group of single purpose merchants and single purpose vendors where only a specified group of merchants can interact with a single vendor.

Another category or group of merchants within the overall system merchant network could by agreement interface with a wide variety of different vendors. Some merchants may be configured solely as card issuing merchants who either issue cards or add value to existing cards while other merchants may serve the dual purpose of issuing and adding value to cards as well as debiting customer subaccounts for purchases made. The status of each merchant will be defined on the system control center to prevent unauthorized merchant transactions. For example, for the situation when Vendor-1 represents a specific city transit organization (e.g., Phoenix Transit), the system would prevent use of that customer's city transit subaccount on Chicago transit buses when a customer travels to Chicago. The system could, however, be readily configured to accommodate a V-1 subaccount corresponding to Phoenix Transit and a V-2 subaccount corresponding to Chicago Transit such that a customer could utilize a single REMOTE SMARTCARD™ product in both Phoenix and Chicago. While customer subaccounts have been designated by the shorthand notation "V-1," and "V-2," the vendor and vendor subaccount identifications are implemented by substantially longer data strings to accommodate access to a wide variety of vendor accounts by a single customer REMOTE SMARTCARD™.

Figure 23:
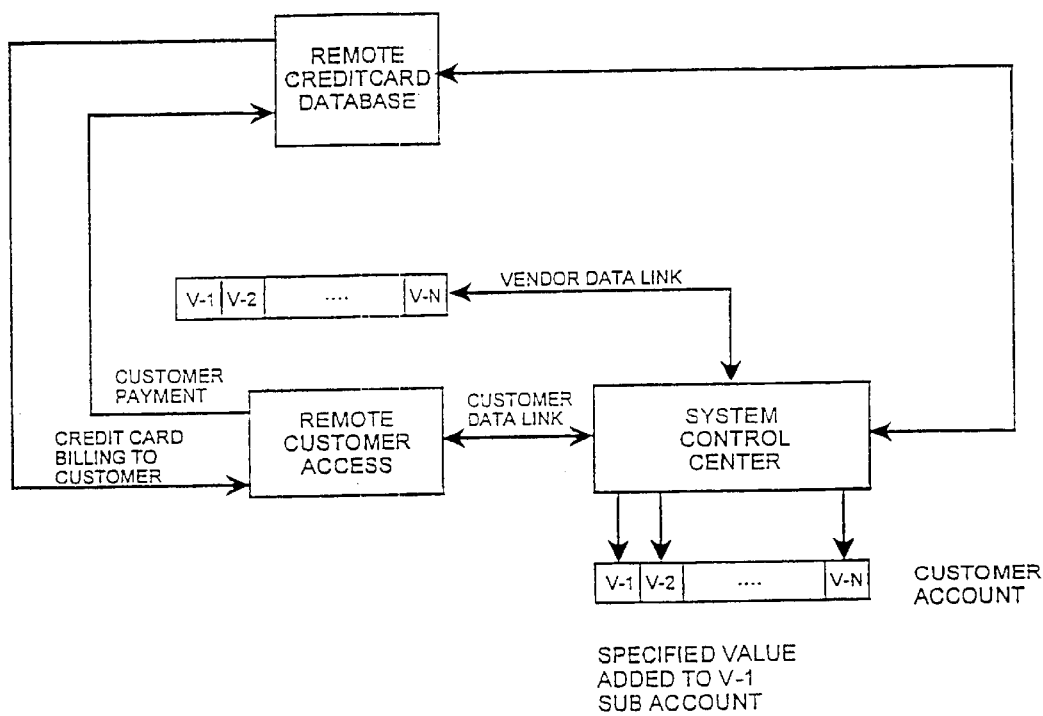
FIG. 23 represents a system diagram illustrating how value is added to a customer subaccount by credit card.

The FIG. 23 diagram supplements the FIG. 19 diagram and explains in greater detail how a customer might directly interface with the system control center without the intervention of a merchant to add value to designated customer subaccounts by credit card. The data link between the customer and the system control center could be provided by an interactive voice response system described above in connection with the FIG. 1–FIG. 17 embodiment where that system is operated by either voice recognition software, by touch tone telephone inputs or by equivalent customer to system control center communication systems. An appropriate customer data link could readily be established by Internet data transfer accessed either from the customer's home personal computer, by an office personal computer or by any other Internet terminal which might be supplied by various vendors or credit card organizations to enhance the vendor or credit card supplier link with its customers.

Appropriate security could be provided during such customer subaccount value adding operators. Typically, security may be enhanced by requiring as a condition on system access the use of one or several of the following confidential information: 1) a PIN number, 2) the customer's telephone number, 3) the last four digits of the customer' Social Security Number, or 4) other similar security information typically known only to the customer. For the customer's home or office computer, appropriate encryption software could provide the necessary degree of system security to prevent unauthorized charges on the customer's credit card.

Once the appropriate data has been supplied by the customer to the system control center, the system control center contacts the remote database, requests authorization for a specified amount of credit and receives authorization for that amount. Upon receipt of that authorization, the system control center distributes the total amount of the requested credit to the one subaccount or plurality of subaccounts designated by the customer data input. When accessing the system control center via the Internet, the customer computer screen might display a series of subaccounts with a plus or minus symbol in each subaccount. By placing the cursor over the plus symbol or the minus symbol, the customer could specify that the balance of a specified subaccount should be either increased or decreased where the increased amount would be transferred from funds received via credit card authorization. When the customer designates that an account balance is to be decreased or potentially zeroed out, customer-directed software inputs will designate where those funds are to be redistributed. As illustrated in the FIG. 23 diagram, the system control center would at the completion of such a customer initiated transaction allow vendors access to such account redistribution data on a real time basis via the vendor data link. All system vendors would thus possess on a real time basis information specifying the total amount of funds held on account for each vendor on REMOTE SMARTCARDs® in the hands of customers as well as the occasional use of, addition to or transfer of the various subaccount credit values on the entire REMOTE SMARTCARD™/system control center platform.

Figure 24:
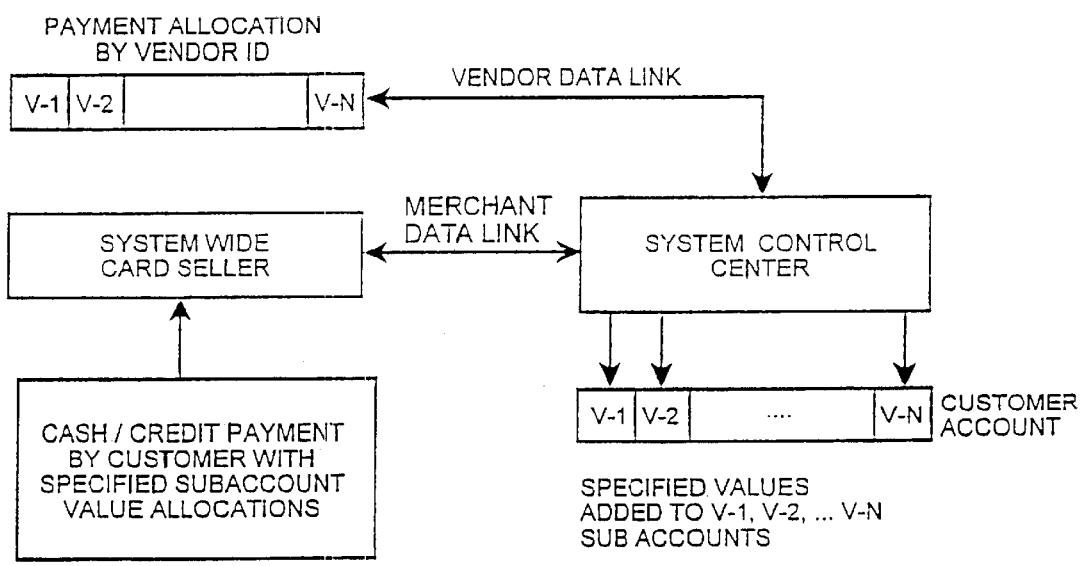
FIG. 24 illustrates the configuration of a system-wide card seller interface.

The FIG. 24 diagram supplements the FIG. 19 diagram by illustrating that certain merchants may be authorized to add value to customer REMOTE SMARTCARD™ subaccounts for the benefit of all system vendors or at least for a defined and relatively large subset of system vendors. A bank ATM machine might be configured to function as a system-wide card seller having the capability of either issuing an initial REMOTE SMARTCARD™ to a particular customer or to add value to designated subaccounts of a previously issued REMOTE SMARTCARD™. Such a system-wide card seller "merchant" category might be staffed by an employee or, as in the case of a bank ATM, operated by a computer. During the transaction between the customer and the system-wide card seller, the customer would designate the amount of value to be added to each designated subaccount. The customer's specified information is communicated via the merchant data link to the system control center which, as a result of the card swipe data from the customer, selects the specific customer account being accessed and distributes the appropriate credit values to-each designated subaccount. This new customer account data is accessible to the vendors via the vendor data link from the system control center.

Figure 25:
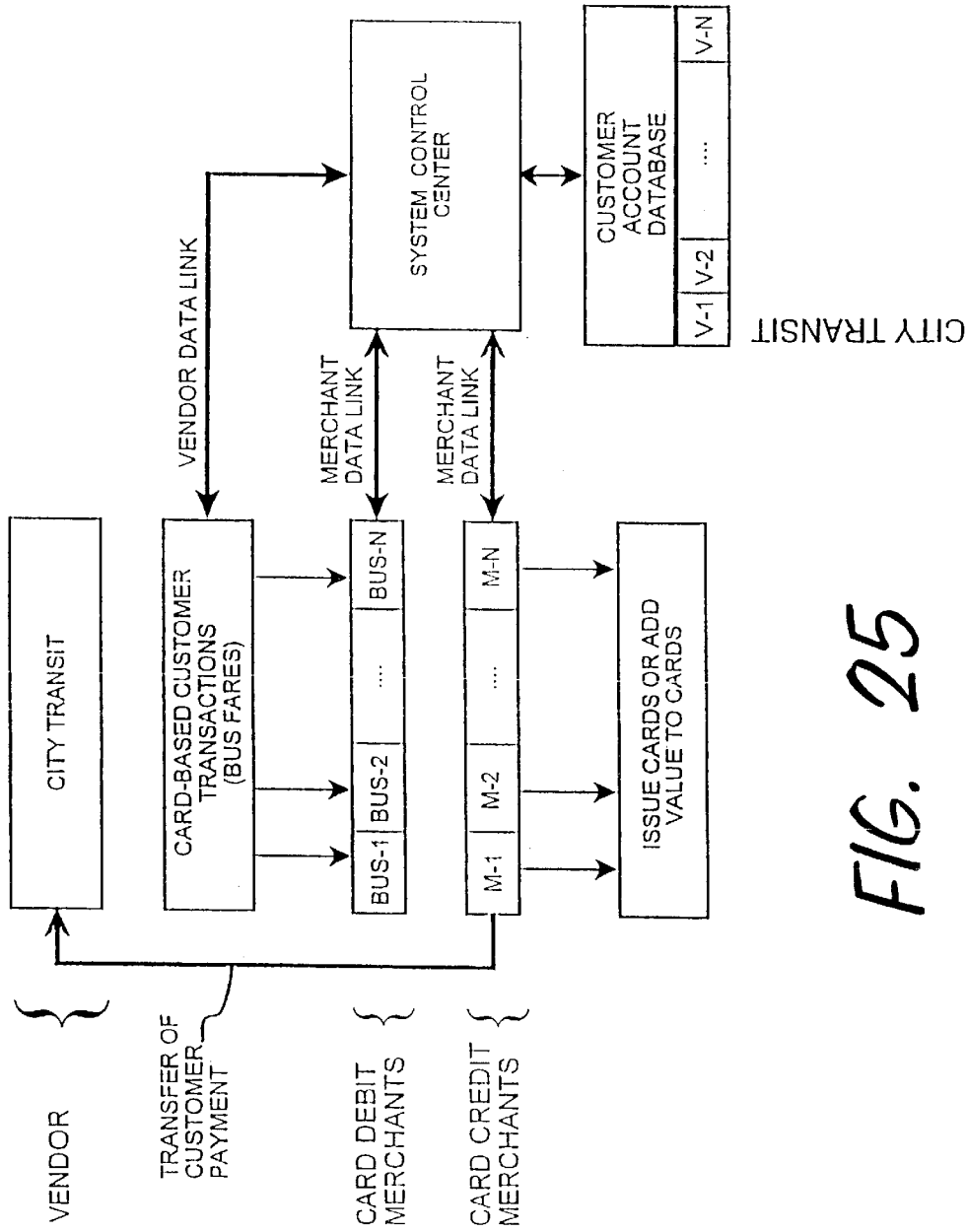
FIG. 25 illustrates multiple merchant categories for a single city vendor.

The FIG. 25 diagram represents a more specific implementation of the system of the present invention where the system merchants are subdivided into two separate classifications: 1) card debit merchants, and 2) card credit merchants. As illustrated in the FIG. 25 diagram, the card debit merchants correspond to the plurality of buses utilized within a single transit system which accept customer cards for fare payment purposes. For such a city transit application, the credit card merchants take the form of a plurality of merchants authorized to receive payment or credit in exchange for bus fare credit for the designated city transit system. As illustrated in the FIG. 25 diagram, both categories of merchants are interconnected with the system control center via the merchant data link. For mobile bus applications, the merchant data link includes a wireless system component as explained in connection with the FIG. 1–FIG. 8 diagrams. The card credit merchants illustrated in the FIG. 25 diagram can be linked to the system control center by wireless data transfer, by telephone or Internet data link. Although it would be possible to configure the system card debit merchants installed on buses to accept customer payment and to add credit to customer card subaccounts, a transit vendor would typically elect to avoid that option to prevent delays and to allow the bus driver to do nothing but operate the bus. The city transit related card debit merchants could be configured as illustrated in the FIG. 19 diagram to allow access to a customer's remote credit card database to add credit to the city transit subaccount, but once again typically a city transit customer would configure its system to avoid the additional processing time (approximately four seconds) and possible driver involvement in implementing such more complex card-based transactions although the system would readily accommodate such additional transaction categories.

In the FIG. 25 diagram, the plurality of credit card merchants might represent a series of systems specific merchants authorized to add value solely to the city transit subaccount of REMOTE SMARTCARDS™ or might represent system-wide card seller merchants of the type discussed in connection with the FIG. 24 diagram. Vendors such as a city transit organization might utilize both system specific merchants as well as a secondary subset of merchants such as 7-11® or Circle K® convenience outlets. The universe of merchants selected by a particular vendor will be determined primarily by economic issues relating to the cost of providing vendor specific merchants and the fees to be paid by non-owned card merchants such as 7-11® or Circle K® convenience stores.

As illustrated in the FIG. 1 diagram illustrating transit-related applications, the system of the present invention contemplates having a central office with a single system control center for accommodating data input from a wide variety of geographically distributed mobile system elements. The same is the case for the FIG. 25 system which is adapted to serve numerous city transit systems geographically distributed throughout the world. All such systems could readily be accommodated and managed by a single system control center interconnected by the Internet, by telephone line or by global wireless systems such as Teledesic or Iridium wireless systems.

The FIG. 25 system configuration might also be implemented by numerous other business categories such as, for example, McDonalds® and Burger King® restaurant chains. Such restaurant chains might wish to implement two categories of merchants such as card debit merchants and card credit merchants as illustrated in FIG. 25. For food purchases, REMOTE SMARTCARD™ customers would utilize card debit merchants stationed at the McDonalds® or Burger King® checkout counters. Funds could be added to a customer's card credit at a separate credit card merchant station located within the restaurant or by generic card credit merchants such as authorized bank ATM machines.

Numerous additional business categories would normally choose to segregate business affiliated merchant terminals into card debit merchants and card credit merchants to maintain high speed customer handling at card debit merchant terminals without the time delays caused by the more lengthy account credit transactions implemented at the card credit merchant terminals. For example, the ABC Parking Company vendor illustrated in the FIG. 18 subaccount diagram might own or operate a plurality of city parking garages which must accommodate huge rush hour customer vehicle exit demands through multiple gate exit ramps. Each exit ramp would include a single card debit merchant terminal which might be configured to utilize a proximity type card reader capable of reading the account data from a customer's REMOTE SMARTCARD™ from a distance by means of radio frequency scanning, laser-based barcode scanning or by other types of remote card data reading systems which provide for high speed data acquisition without requiring physical contact with a customer's REMOTE SMARTCARD™. Whatever form of card reading system used, the system of the present invention would within less than one second transmit to the gate lift actuator for the exit ramp as well as to the customer an "ACCEPTED" OR "DECLINED" status allowing vehicles to exit the garage exit ramps with almost imperceptible delays attributable to the card reading function. The application of the high speed transaction processing system of the present invention to fast food restaurants, cafeterias, parking garages and related high customer volume businesses would vastly enhance the customer flow rates of such businesses.

When using conventional credit cards for processing food or parking charges, approximately one minute and twenty seconds to one minute and thirty seconds is incurred during the transaction which involves performing each of the following transaction steps: 1) exchange of the physical credit card, 2) the card swipe operation, 3) implementation of telephonic access with the remote credit card database, 4) procurement of authorization for the amount to be charged, 5) receipt printing, 6) customer signature, and 7) issuance of a duplicate receipt to the customer. Since the system of the present invention operates essentially in real time, does not require a customer's signature and does not provide the customer with a hard copy receipt, utilizing the system of the present invention saves approximately one and one half minutes of employee and customer time in comparison to conventional credit card transaction processing.

Even when a customer pays cash to a vendor such as a McDonald's ® restaurant cashier or a parking garage attendant, a substantial processing delay is incurred during implementation of the following processing steps: 1) announcing to the customer the amount of the charge, 2) waiting for the customer to locate and extract the appropriate amount of paper and coin currency, 3) handing the money to the cashier, 4) sorting the money into the proper cash register drawer receptacles, and 5) making change and handing a receipt to the customer. Although somewhat shorter in duration than credit card transactions, cash transactions also cause substantial delays. Using the REMOTE SMART-CARD™ to avoid cash transaction from thirty seconds to more than a minute and can thereby vastly accelerating cash transactions.

The foregoing explanation taken together with the FIG. 25 diagram illustrate the advantages of separating merchant terminals into debit and credit terminals where debit terminals are restricted to accepting vendor payment transactions while debit terminals are restricted to receiving customer funds or credit card charges and transferring those funds to designated customer subaccounts stored on the system control center.

Figure 26:
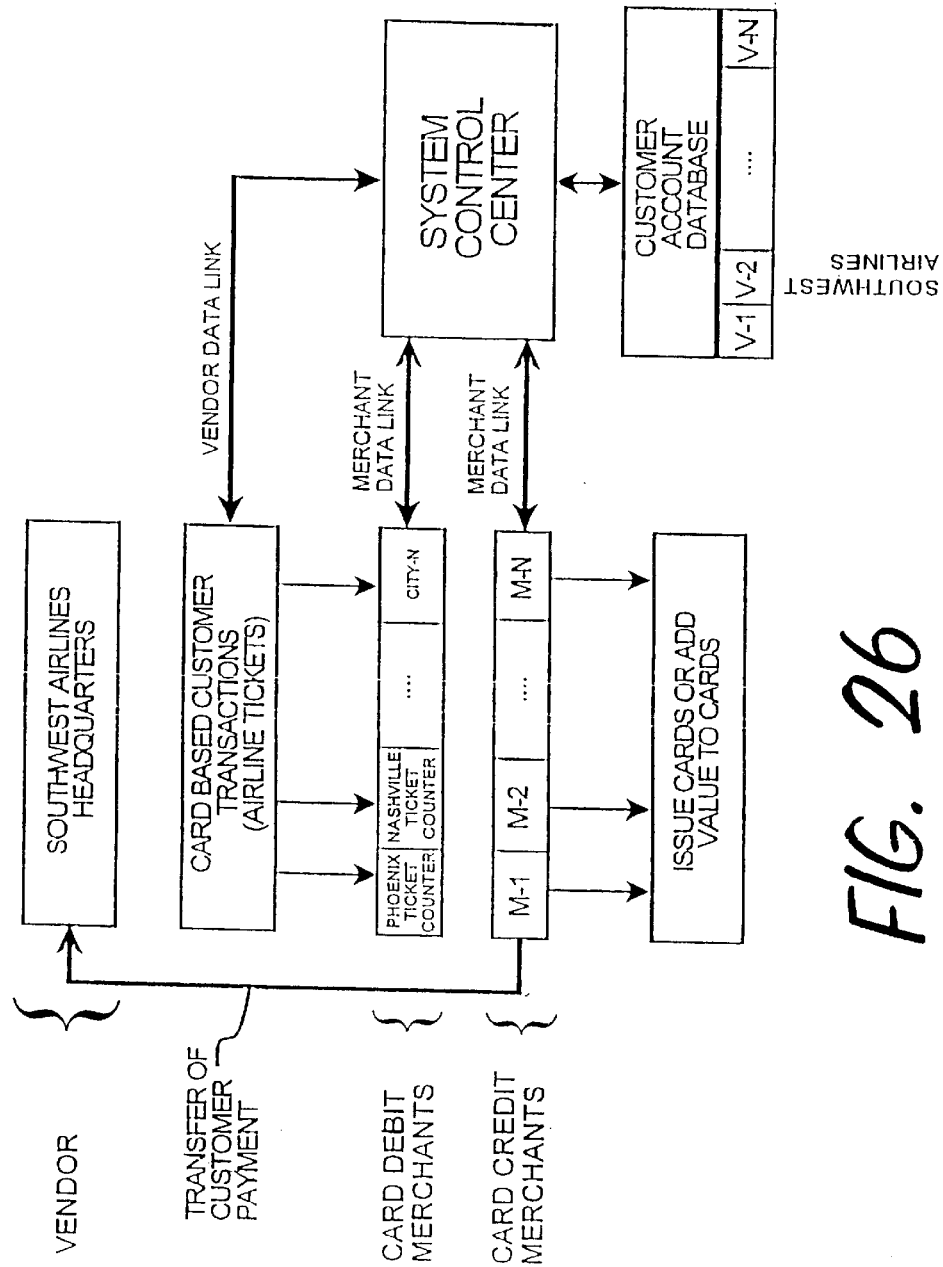
FIG. 26 illustrates multiple merchant categories for multiple city vendors.

The FIG. 26 diagram is related to the FIG. 25 system diagram, but illustrates the application of the present invention where a single business organization such as Southwest Airlines provides services or sells merchandise in many different cities. The FIG. 26 business model will apply to large chain-type vendors such as Home Depot, Wal-Mart, Sears, Costco, etc. as well as parking lot operations which may operate from either a single city or from multiple cities and restaurant chains which may operate from either a single city or from multiple cities.

Southwest Airlines has been selected to explain the FIG. 26 business model because its operating mode and related problems are well known. As illustrated in FIG. 26, Southwest Airlines has a single Dallas, Tex. headquarters which interfaces with the system control center via the vendor data link.

REMOTE SMARTCARD™ users hand over their REMOTE SMARTCARDS® at the Southwest Airlines ticket counters at Phoenix, Nashville and other Southwest Airlines bases to pay for ticket charges using the real time system transaction speed. Vendors such as Southwest Airlines could restrict the use of select ticket agents for REMOTE SMARTCARD™ users only due to the transaction speed as well as to provide an incentive for customer use of REMOTE SMARTCARDS® where the value has been prepaid. Via the real time merchant data link, Southwest ticket agents will be advised in less than one second after the card swipe operation whether the customer's REMOTE SMARTCARD™ has been "ACCEPTED" or "DECLINED."

As illustrated in FIG. 26, Southwest Airlines can provide other facilities for credit card merchant terminals to either issue or add value to REMOTE SMARTCARDS®. Any elected incentive or cost discount could take place at these merchant terminals where more than one dollar of airline travel could be transferred to the designated Southwest Airlines customer subaccount in exchange for one dollar of actual charge based on the fact that the airline immediately receives possession of the customer's funds even though those funds cannot be spent until a ticket has been used for air travel. When in-house credit card merchant terminals are used, the transfer of a customer's payment presents an essentially internal operation. When outside credit card merchant terminals are used, any one of the various alternative methods of transferring customer funds from the merchant to the vendor can be implemented The FIG. 27 diagram illustrates a multiple merchant/multiple vendor system configuration for accommodating numerous, geographically distributed vendors. Although the group of merchants M-1, M-2 . . . M-N shown associated with each vendor are depicted as a single category of merchants, the system of the present invention will more typically be implemented with two sets of merchants as illustrated in the FIG. 25 and FIG. 26 diagrams. The dual purpose merchant configuration where a single merchant using a single merchant terminal both issues and adds value to REMOTE SMARTCARDS® as well as subtracts value at the time of sale will most often be used at lower volume sales outlets such as convenience stores, camera shops and smaller retail outlets rather than at high customer volume organizations such as retail chain stores, fast food restaurants and parking lot operations. Although the same symbols have been used to designate the network of merchants M-1 through M-N for each of the vendors, many different merchant families or categories will be defined and implemented to serve a single vendor as well as various different groups of vendors. It would be possible to establish a single universal system-wide card seller to issue and add value on behalf of all system vendors or for a relatively large group of vendors.

Figure 27:
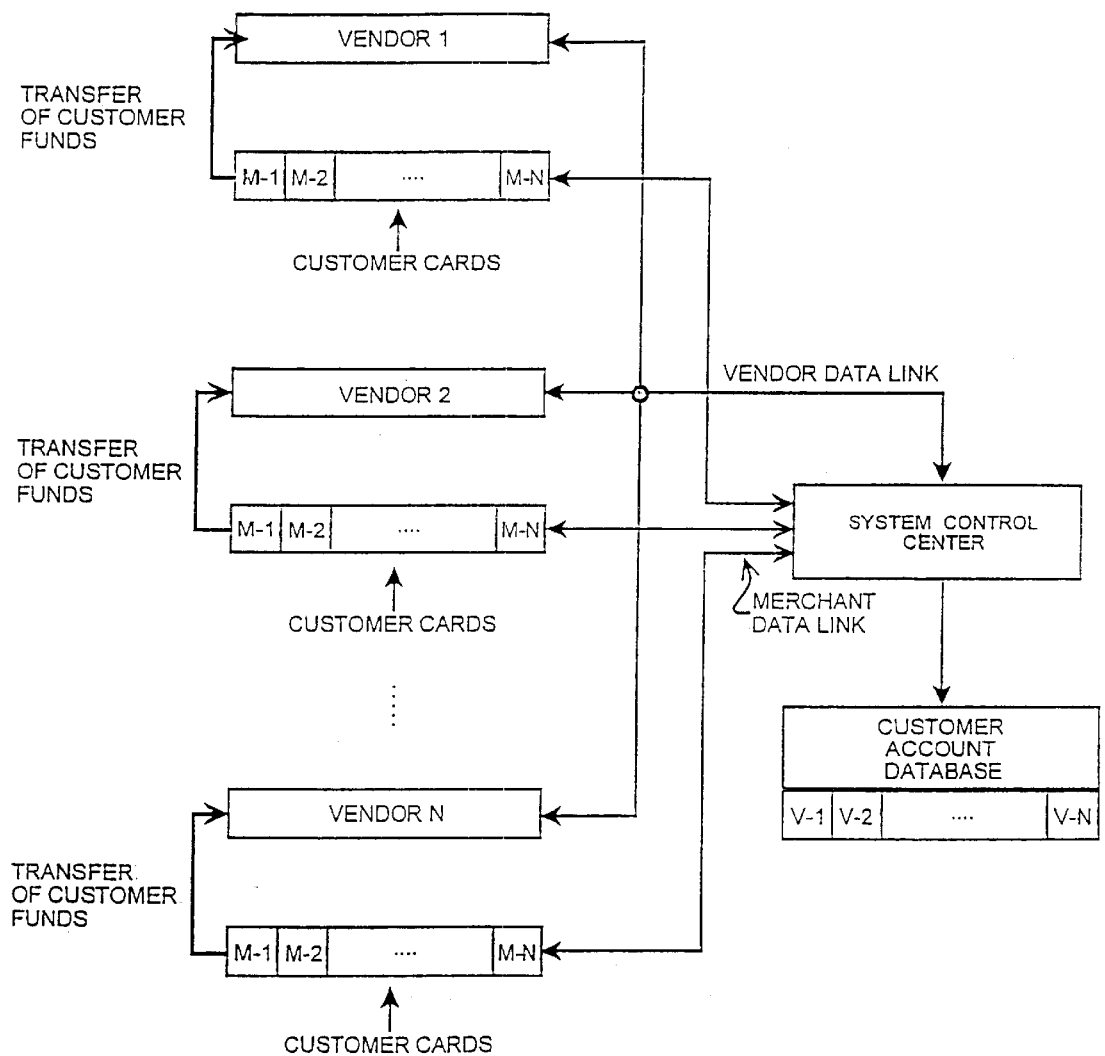
FIG. 27 illustrates a multiple merchants/multiple vendor configuration.

For the FIG. 27 system configuration, various local networks may be set up to interconnect merchants with the system control center or vendors or designated groups of vendors with the system control center.

Figure 28:
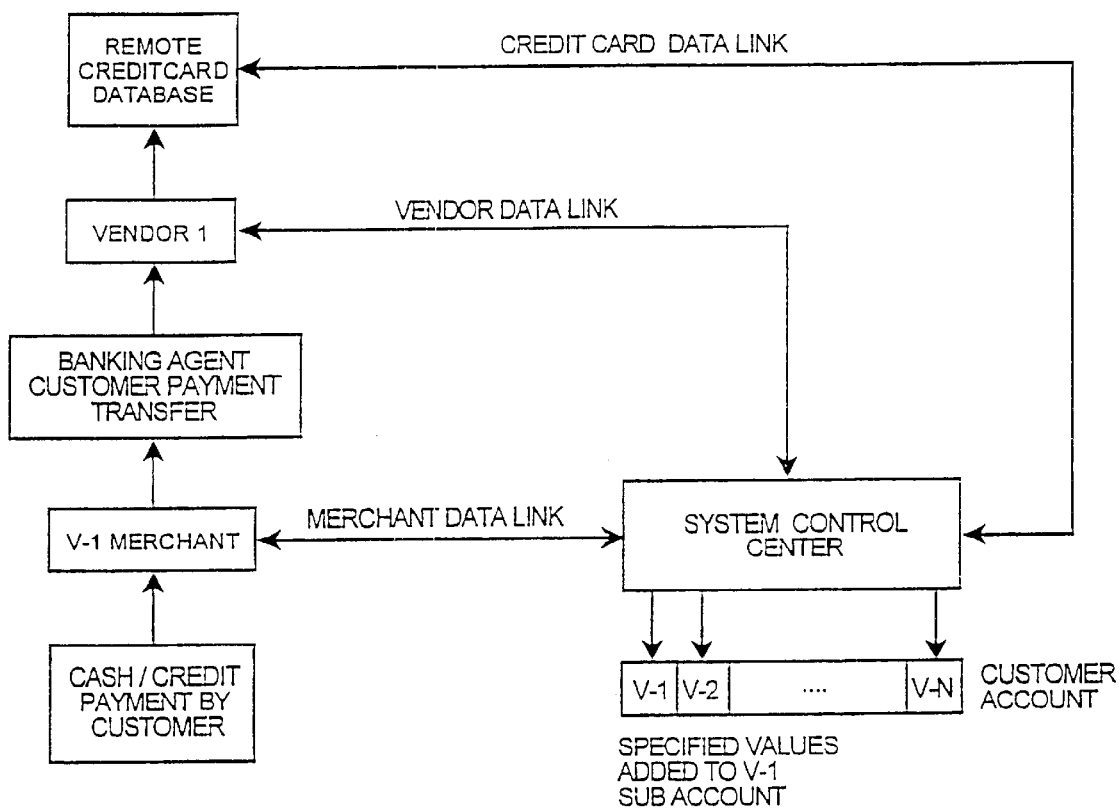
FIG. 28 illustrates a merchant to vendor fund transfer via a banking agent.

The FIG. 28 diagram illustrates that the merchant to vendor fund transfer may be handled by an intermediary such as a banking agent. In such an application, the V-1 merchant would either electronically or physically transfer funds received from a customer to an authorized banking agent. As a result of a similar relationship being set up between Vendor-1 and the banking agent, customer funds could be either physically or electronically transferred from the V-1 merchant to Vendor-1. If a group of merchants and a group of vendors all share the same banking agent or cooperating banking agents, a substantial portion of the customer payment funds could be electronically transferred from the merchants to the vendors with minimal complexity.

Figure 29:
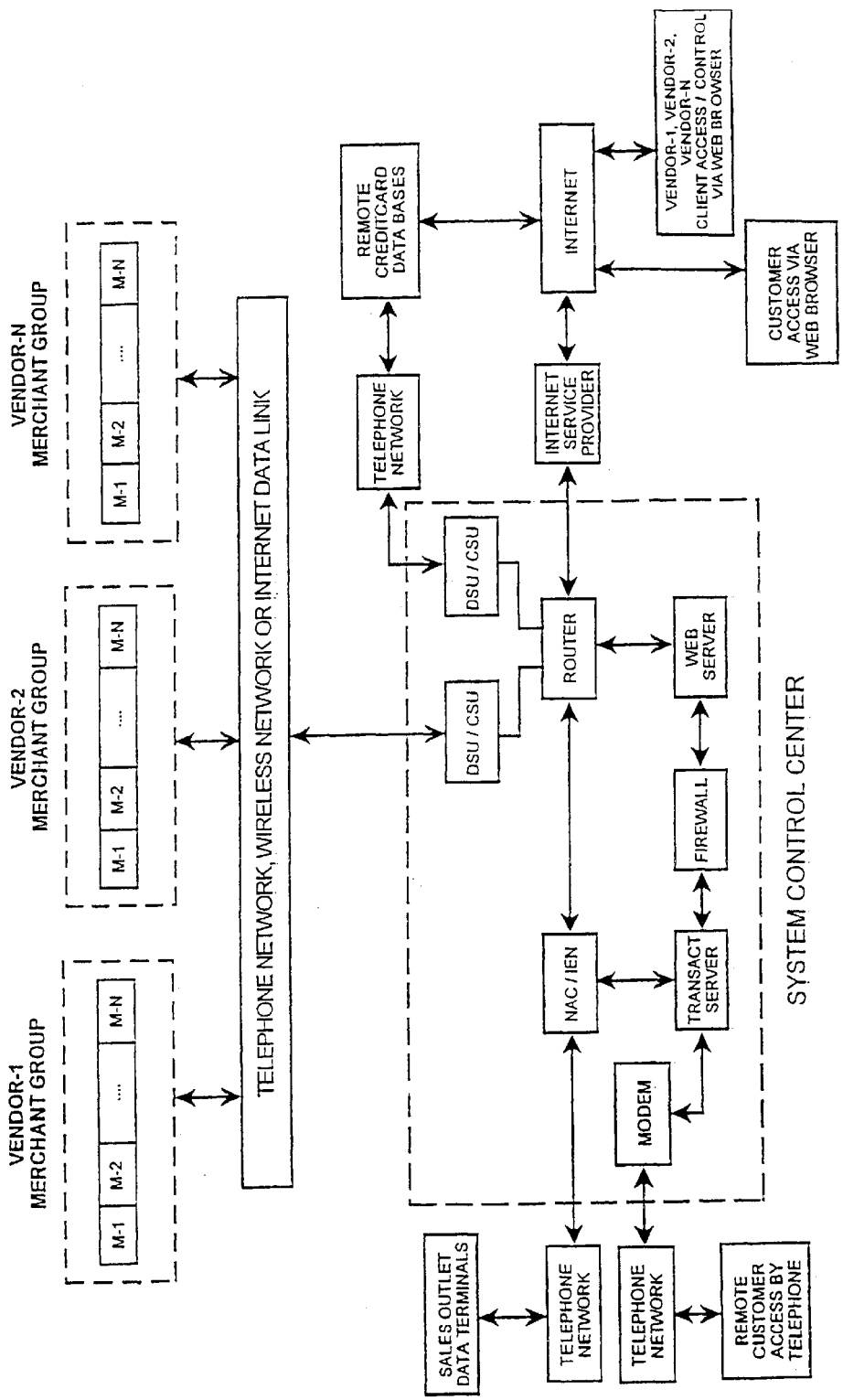
FIG. 29 illustrates a multiple merchant/multiple vendor system configuration.

The FIG. 29 diagram illustrates one preferred configuration for a multiple merchant/multiple system configuration showing one particular hardware embodiment. The FIG. 8 diagram discussed above in connection with transit application for the REMOTE SMARTCARD™ of the present invention has been more broadly configured in the FIG. 29 diagram for more generic applications.

A Hypercom T7C card reader has been found to function satisfactorily with the system of the present invention because it includes compatible software and a multiple telephone number dialing capability. Such card reader terminals are typically utilized for procuring telephone authorization for standard VISA, MasterCard and other credit cards. When using a REMOTE SMARTCARDT™, the Hypercom terminal must be configured to dial a telephone number suitable for contacting the system control center of the present invention. The Hypercom card reader operator pushes a button or performs some other task which enables the terminal REMOTE SMARTCARD™ function for system control center verification as opposed operates as a conventional credit card. When a customer's conventional credit card has been set up to function as a REMOTE SMARTCARD™ according to the present invention, the Hypercom terminal operator must press the same button or perform the same system configuration to cause the Hypercom terminal to be interconnected with the system control center. As explained above in connection with the FIG. 1–FIG. 17 embodiment of the invention, the dispatch element of the system control center accepts conventional credit card data and allows it to function as a REMOTE SMARTCARD™.

Figure 30:
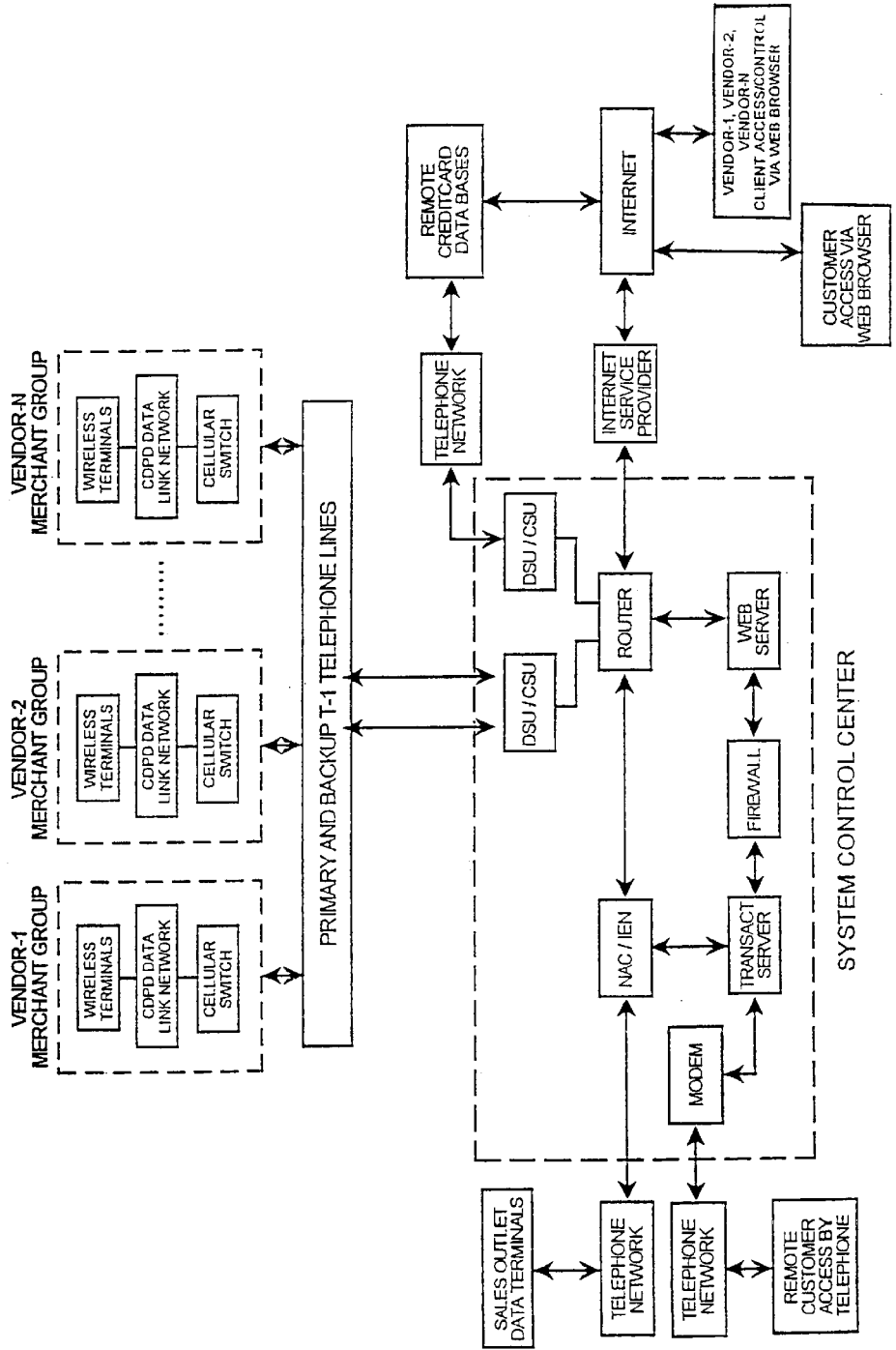
FIG. 30 illustrates a wireless merchant system interface.

The FIG. 30 diagram is related to the FIG. 29 system diagram, but illustrates the use of a wireless merchant system interface. Such a wireless interface might be provided by LAN-based CDPD modem facilities or by satellite-based wireless systems such as the Teledesic or Iridium wireless data link systems.

The FIG. 31 diagram illustrates the various available system customer money flow paths. FIG. 31A illustrates a FIG. 19 type system where the customer's funds are transferred directly from the merchant to the vendor. FIG. 31B illustrates the FIG. 28 system configuration where the customer's funds are transferred form the merchant to a bank to the vendor. The FIG. 31C diagram generally illustrates the FIG. 28 money flow path where the funds are authorized by a customer, but actually paid to the vendor by the customer's credit card company.

In all three situations illustrated in FIG. 31, money or funds are transferred from the customer to the vendor such that the system control center of the present invention is never required to either take title to any money or funds or to actually handle any currency or credit card funds. Instead, the system of the present invention performs a bookkeeping or record keeping function on a high speed real time basis which allows it to utilize a card having zero intrinsic value where the value data is accessed in real time from the remote database stored on the system control center computer, computer memory and computer database. The system of the present invention thereby avoids the requirement for bank-type security since no cash is handled and similarly avoids liability for loss or theft of currency. The system of the present invention is instead entirely data driven, does not legally represent a bank, and is not subject to banking regulations. While the system can be configured to periodically submit billing statements to merchants who have collected customer funds for the purpose of having the merchant pay the vendor money received by merchants on behalf of the vendor, even in that application the system of the present invention does not take title to or handle customer funds at anytime.

Figure 32:
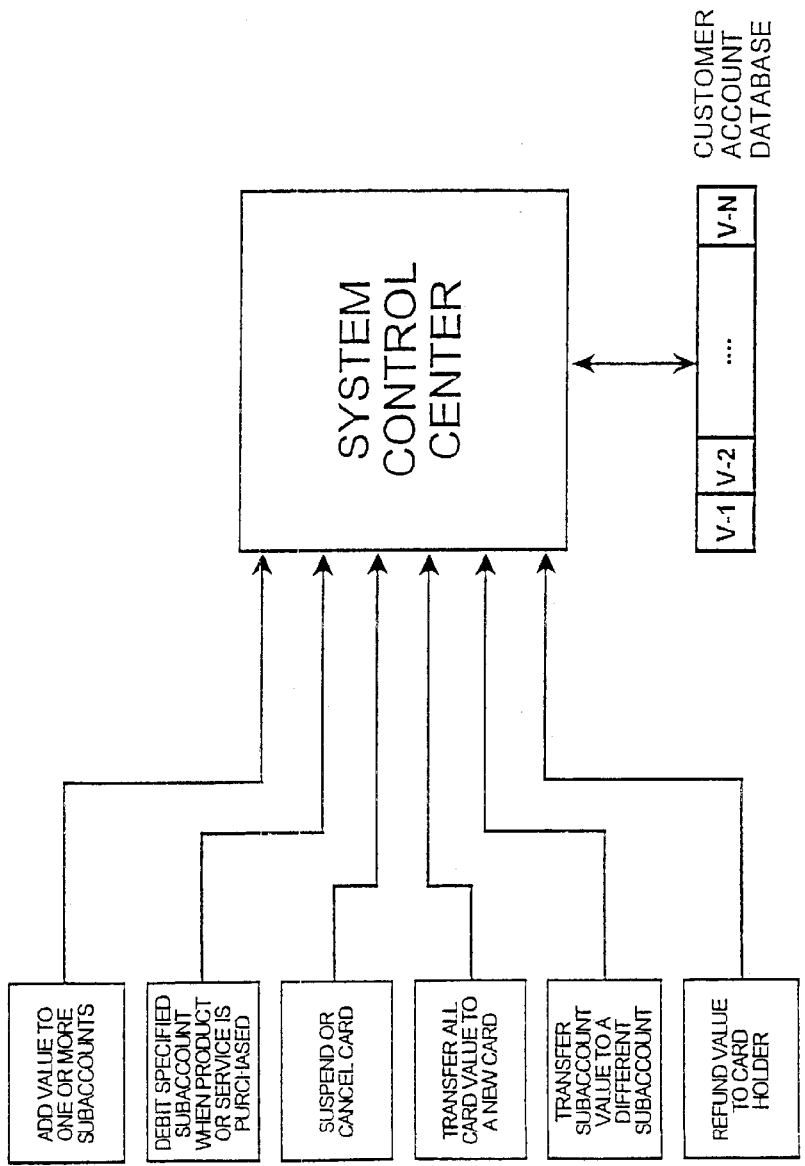
FIG. 32 illustrates card-related system functions and advantages.

FIG. 32 briefly summarizes some of the many card-related system function discussed above. As noted in FIG. 32, the system may be configured to suspend or cancel a card upon receipt of appropriate password protected instructions from a customer who has either lost a card or had a card stolen. Value on an existing card can be transferred to a new card when a prior card has been suspended or canceled in response to customer instructions or when a card has simply become physically worn out from extended periods of use.

As noted above, the system can be configured to transfer account value from one subaccount to a different subaccount. In some instances, the system will be configured such that it is incapable of refunding card value to a card holder and instead requires that the card value be actually spent by the card holder. Since the system of the present invention never handles or takes title to the customer's funds, it is impossible for the system itself to refund money to a customer who has canceled or suspended his account. Refund activities, if set up at all, would be handled directly between the customer seeking the refund and either a merchant or the appropriate vendor. The system of the present invention would merely continue to perform its accounting function and would be advised by either the vendor or the merchant that that card value had been refunded to the customer causing the system to zero out and cancel the customer's account.

The business model described above encompasses an Internet-based zero intrinsic value REMOTE SMARTCARD™ where the account value data is accessed in real time from a remote database. The system can accommodate multiple vendor accounts by use of a single REMOTE SMARTCARD™. New vendors and new merchants can be added to the system by software revisions implemented solely on the system control center. The system of the present invention is compatible with either moving or stationary merchants or vendors, and provides worldwide access, including access to remote areas without normal communications system infrastructure due to its ability to accommodate satellite-based wireless data link systems.

The high speed, real time system of the present invention yields extremely low transaction processing costs such that vendors can be charged a fixed cost per transaction independent of the purchase amount. Depending on vendor transaction volume, availability of local infrastructure and numerous other considerations, a vendor might be charged a transaction processing fee of as low as five cents per transaction. Use of the business model described above avoids involvement with the two element, variable credit card charges involving typically a fifteen to twenty cent per transaction fixed fee together with a one and one half to four percent discount fee which is directly related to the amount of the purchase. The low transaction cost resulting from the business model described above results from the use of a single site system control center, computerized real time processing in combination with low cost, high speed data link infrastructure interconnecting the system control center with its affiliated customers, merchants and vendors. When a conventional magstripe credit card product is used as a REMOTE SMARTCARD™ as an element of the present system, such magstripe card is compatible with many existing card readers which are commercially available at relatively low cost.

When viewed from the standpoint of the merchant and vendor, the high speed real time transactions available from the system of the present invention dramatically reduce processing time and hence cost. After the merchant has entered the transaction data such as product cost and has swiped the customer's REMOTE SMARTCARD™ through the card reader, the system yields a response in less than one second, essentially in real time. Use of the REMOTE SMARTCARD™ represents a paperless cash transfer transaction with no customer signature required. Although a paper receipt can be printed in one second and delivered to the customer, provision of a hard copy receipt is not a necessary element of the present invention. When the merchant's card reader displays an "ACCEPTED" status, that status display confirms that the customer is using an authorized REMOTE SMARTCARD™ and that the subaccount value is sufficient to cover the purchase cost. As a result, the merchant is guaranteed that he will be paid in full for the service or merchandise delivered.

The system accommodates prompt settlement because the system control center operates in real time. As between the merchant and the vendor or as between the vendor and a credit card agency, settlement can most conveniently take place on an overnight basis so that the vendor promptly receives the funds in relationship to the time of the customer transaction.

With the system of the present invention, responsibility for reporting loss or theft of the REMOTE SMARTCARD™ is placed on the card holder. Neither the merchant nor the vendor is responsible for any unauthorized use of the card because that responsibility has been placed on the card holder. When a customer wishes to report a lost or stolen card, the customer contacts the system control center by interactive voice response equipment activated by conventional touch tone telephone equipment or by Internet to promptly suspend or cancel the card account. When a canceled or suspended card is attempted to be used after it has been suspended or canceled, the merchant receives a "DECLINED" indication, but is not forced to confiscate the card since it has been deactivated and will never again function in the system.

The REMOTE SMARTCARD™ of the present invention is distinct in many ways from conventional smart card products which include complex built in electronic circuitry which allows specified value to be stored on the card itself. First, REMOTE SMARTCARD™ products can be configured as a thirty-five cent cost per card plastic card with data encoded on a conventional magstripe. A conventional smart card with its electronics and on-board battery currently sells for from five to seven dollars per card.

With a conventional smart card, the card cash value is assigned by special electronic smart card interface equipment operated by trained personnel. If a customer desires to add value to a smart card, the card must be delivered back to an authorized location having the special interface equipment and trained personnel for the purpose of reprogramming the internal smart card electronics.

If a conventional smart card is lost or stolen, the stored card value can be used without restriction on a same as cash basis by whoever possesses it. When the holder of a conventional smart card desires to use that device to implement a transaction, the merchant requires special equipment for interfacing with, reading and modifying the stored contents of the smart card electronics. It is possible that conventional smart card products could be acquired and programmed with unauthorized equipment on a decentralized basis and used on a same as cash basis the same as counterfeit currency. The security risks with a conventional smart card are therefore substantial.

Conventional smart card products are susceptible to loss, theft and misuse because such equipment lacks a centralized system control center capable of maintaining a real time link between an authorized customer/card holder and the related customer account. As a result, the holder of a conventional smart card cannot take action to suspend or cancel the smart card after it has been lost or stolen. The system of the present invention by operating from a single system control center provides an unchanging, specified point of contact for a card holder for the purpose of manipulating, canceling or suspending a REMOTE SMARTCARD™ at any time.

Because the REMOTE SMARTCARD™ of the present invention utilizes a system of vendor subaccounts as illustrated in the FIG. 18 diagram, a REMOTE SMARTCARD™ customer can utilize the customer account data stored on and accessible from the system control center for budget tracking or budget compliance purposes. By accessing his account via the Internet, the customer can procure and print out a spending summary over a defined period of time on a subaccount by subaccount basis to track spending habits and possible spending deficiencies. The system may be configured at customer request or automatically to mail out printed expense summaries to customers for an additional charge. The system software may also be configured to export to customers account data and history to a Quicken® financial software compatible database for storage or analysis by the customer.

Although the REMOTE SMARTCARD™ has been described above essentially as a prepay system where card value cannot be spent before it has been paid for in advance, the system can be reconfigured in certain circumstances to function as a post-pay system if and when authorized by selected vendors. For example, in connection with a city transit application, a transit authority may elect that for designated card holders who have done business with the transit organization for at least one year, system overcharges within a defined amount, such as up to ten dollars, might be authorized. The transit agency would then either arrange for or directly bill its card holder/customer for the account deficit while allowing that particular card holder to continue using the transit services even with a zero subaccount value. If payment for the overdrawn amount was not received by a specified time, the transit authority could take action to suspend the customer's authorization to charge from the transit subaccount. Numerous variations and permutations of this particular deficit spending feature of the present invention would be readily obvious to those skilled in the art.

The REMOTE SMARTCARD™ of the present invention can be used anywhere where cash or value changes hands as well as anywhere a credit card either has been used or could be used. A REMOTE SMARTCARD™ is particularly valuable where a nearly instantaneous real time response is required and where a vendor or merchant wishes to avoid prolonged interaction with a customer by either receiving and providing change for a currency payment or by utilizing a standard credit card. The following additional applications fall directly within the scope of the maximum benefit for use of REMOTE SMARTCARD™ products: subway fare cards, taxicabs, movie theaters, car washes, retail outlets, fast foot restaurants, bookstores, etc.

The United States Government has recently sought to reduce welfare fraud by reducing use of food stamp-type welfare payments where a piece of paper possesses a monetary value. The Government has recently commenced implementing an electronic benefit card which presumably could be used as a substitute for food stamps, for welfare payments, for Medicare payments and possibly for check-type payments such as providing Social Security payments to Social Security recipients.

By issuing an electronic benefit card configured as a REMOTE SMARTCARD™, the relevant government or state agencies could by communicating with the system control center of the present invention set up and transfer credits to defined subaccounts of electronic benefit cards issued to intended beneficiaries. The system would be further configured such that only authorized merchants could access the electronic benefit card subaccount value. The system could also readily be configured in a situation where a supermarket selling both authorized and unauthorized, welfare-qualified goods could refuse to allow unauthorized charges to be taken from an electronic benefit card. For example, at a Safeway® grocery store, an electronic benefit-type REMOTE SMARTCARD™ can be configured to process charges only for food items and not for unauthorized items such as beer, wine, liquor, cigarettes, magazines, light bulbs, etc. Because such supermarkets typically use barcode scanning devices at the checkout counter and print receipts which specifically identify each product purchased, an appropriate database software could be configured to disallow unauthorized product purchases at the point of sale.

The system of the present invention may also provide enhanced management and marketing data to the vendors and merchants who elect to utilize the REMOTE SMARTCARD™ system. First, a large volume of customer purchase data may be derived from the merchant and vendor data links from the system control center on a real time basis in response to customer purchase activities. Either a vendor or a merchant could provide data indicating customer traffic on a customer per hour basis, amount spent per customer per hour basis, on the basis of gross receipts per hour, per day, per week or per month.

By using appropriate database software, both merchants and vendors could acquire highly useful inventory and marketing information by blending together merchant transaction data with REMOTE SMARTCARD™-related data. By using barcode scanning information, the merchant and vendor both have the capability of tracking the product identified contents of all cash register receipts, including time of day, cash register number, card reader identification, Internet IP address as well a transaction amount. By using the REMOTE SMARTCARD™, the system control center receives as a result of each transaction the following data: time of day, IP address of card reader, merchant identity, subaccount to be accessed together with vendor identification, card holder account number, card holder identification, including name, address and additional data, together with the total amount purchased.

By blending together the merchant transaction data with the REMOTE SMARTCARD™-related data, both the merchant as well as the related vendor would receive sales data linked to specific customers to allow for highly refined customer product purchase data mapped out by customer address or by zip code allowing for targeted or highly focused post-sale customer contact or follow up marketing.

As an additional management and marketing benefit of the present invention, vendors and merchants could provide incentive based discounts to encourage persons to acquire and use REMOTE SMARTCARD™ products for the purpose of expediting transaction processing at fast food restaurants, cafeteria lines or parking garages as well as many of the other applications discussed above. For these merchants and vendors, expediting transaction processing time saves money, reduces staffing requirements and reduces waiting time in lines.

A vendor such as a dry cleaner or grocery store could provide time of day defined promotional discounts for REMOTE SMARTCARD™ users to influence customer traffic flows to specific days or times of days when the merchant or vendor experiences reduced traffic flows. For example, a dry cleaner could give a five or ten percent discount for use of REMOTE SMARTCARDs® on Tuesdays. A grocery store could provide a two percent discount at all times for using REMOTE SMARTCARDT™ products, a larger discount for card based purchases made at specific days and times or a ten percent discount for REMOTE SMARTCARD™ senior citizens. Grocery stores might also run discounts on special items for REMOTE SMARTCARD™ users only and for specified items.

Chain stores such as K-Mart® could run a "blue light special" on a defined product on a store by store basis but only for REMOTE SMARTCARD™ holders.

When used as a loyalty card, a fast food restaurant such as a Burger King® could provide a free meal if a REMOTE SMARTCARD™ customer made three purchase transactions within one week where each transaction exceeded five dollars. The system control center software could readily be programmed in response to input vendor Burger King® to provide such loyalty-related promotional benefits. Video stores and other retail establishments which rely on repetitive customer visits could similarly benefit from the ability to reconfigure and modify promotional or discount fare structures via the single site system control center.

Use of the REMOTE SMARTCARD™ of the present invention provides substantial security benefits. Because the account value is stored on the system control center and not on the card, loss or theft of the card does not result in loss of the stored card value. The real time processing speed provide by the REMOTE SMARTCARD™ simulates the use of a conventional smart card with the value stored on the card without suffering from the cost and security shortcomings of conventional smart card products.

The ability of the system to utilize standard credit cards once they have been activated to operate with the system substantially simplifies the card issuing task and provides a special form of security. Since a criminal cannot distinguish a conventional credit card from a conventional credit card configured to operate as a REMOTE SMARTCARD™, there is no greater incentive to steal conventional credit cards configured to operate as REMOTE SMARTCARDs®.

Improper use of a REMOTE SMARTCARD™ is extremely difficult since the card account number data reveals no information about the value stored on the system control center corresponding to that card or the subaccount identity or subaccount balances for that particular account number. Only the legitimate owner of a REMOTE SMARTCARD™ having access to the appropriate PIN number and related password security data can contact the system control center and download the subaccount identity and subaccount balance data. The fact that the REMOTE SMARTCARD™ system operates through a single site system control center substantially enhances the overall system security.

Unauthorized use of a REMOTE SMARTCARD™ is further reduced by the fact that a particular subaccount value can only be accessed by an authorized merchant who must be identified to the system control center by the IP address of an authorized card reader. Access is limited at all times to the customer's stored subaccount value as maintained by the system control system.

Since a card swipe of an authorized and active REMOTE SMARTCARD™ on an authorized merchant card reader yields only an "ACCEPTED" or "DECLINED" output, an unauthorized user learns nothing more about the contents of the authorized customer's account balances by successfully using a stolen customer's card one time.

The system of the present invention could be programmed to automatically suspend or cancel a REMOTE SMARTCARD™ which was activated at an authorized system merchant where the card holder had no subaccount value relationship or when the REMOTE SMARTCARD™ was accessed a specified number of times and received a "DECLINED" response indicating either a zero subaccount balance or the absence of a corresponding subaccount. Numerous different categories of cross-checking or security analysis could be implemented to automatically deactivate a REMOTE SMARTCARD™ when the system detected an excessive amount of improper card usage.

It will be apparent to those skilled in the art that the disclosed Internet-based zero intrinsic value smart card with value data accessed in real time from a remote database may be modified in numerous ways and may assume many embodiments other than the preferred forms specifically set out and described above. Accordingly, it is intended by the appended claims to cover all such modifications of the invention which fall within the true spirit and scope of the invention.

We claim:

1. A card-based system for electronically transferring funds in real time comprising:
   a. a customer card for storing digital data representing a unique customer account number associated with a unique, remotely located customer account having at least one vendor-associated subaccount;
   b. a merchant terminal having a merchant IP address designating a unique merchant affiliated with at least one unique vendor for transmitting to a system control center customer transaction data including the merchant IP address, the customer account number read from the customer card and account adjustment data designating either the value of a credit to be added to the vendor-associated subaccount reflecting a customer pre-payment or the value to be subtracted from the vendor-associated customer subaccount reflecting a customer purchase; and
   c. the system control center for maintaining a vendor account database and a customer account database, the customer account database associating each customer account number with the unique customer account number, for storing the subaccount credit balance corresponding to the specified vendor, for receiving the customer transaction data transmitted by the merchant terminal, for adjusting the customer subaccount value up or down in response to the customer transaction data, for transmitting to the merchant terminal customer account status information and for adjusting the vendor account database to reflect credits resulting from vendor-associated customer transactions.

2. The card-based system of claim 1 further including a vendor datalink for transmitting data between the vendor and the system control center for enabling a vendor to access and review the vendor database.

3. The card-based system of claim 2 wherein the vendor datalink is established via the Internet.

4. The card-based system of claim 1 further including a wireless datalink network for transmitting data between the merchant terminal and the system control center.

5. The card-based system of claim 1 further including an Internet datalink for transmitting data between the merchant terminal and the system control center.

6. The card-based system of claim 1 further including a remote credit card database and a credit card datalink for transmitting data between the system control center and the credit card database.

7. The card-based system of claim 6 wherein the credit card database is coupled to the system control center via the Internet.

8. The card-based system of claim 7 further including an Internet data interface for enabling a customer having a customer card to access the customer account database on the system control center via the Internet and for enabling the customer to transfer funds from the remote credit card database to the customer account database.

9. The card-based system of claim 1 wherein the merchant terminal designates a merchant affiliated with first and second vendors.

10. The card-based system of claim 1 wherein the customer account database includes multiple subaccounts wherein each subaccount corresponds to a unique vendor and wherein the credit balance of each subaccount can be adjusted independently of the credit balances of the other subaccounts.

* * * * *